US009813694B2

(12) United States Patent
Zhong et al.

(10) Patent No.: US 9,813,694 B2
(45) Date of Patent: Nov. 7, 2017

(54) DISPARITY VALUE DERIVING DEVICE, EQUIPMENT CONTROL SYSTEM, MOVABLE APPARATUS, ROBOT, AND DISPARITY VALUE DERIVING METHOD

(71) Applicants: Wei Zhong, Dan Dong (CN); Kiichiro Saito, Kanagawa (JP)

(72) Inventors: Wei Zhong, Dan Dong (CN); Kiichiro Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 293 days.

(21) Appl. No.: 14/680,245

(22) Filed: Apr. 7, 2015

(65) Prior Publication Data
US 2015/0296202 A1    Oct. 15, 2015

(30) Foreign Application Priority Data

Apr. 11, 2014  (JP) ................................. 2014-082182
Mar. 18, 2015  (JP) ................................. 2015-055439

(51) Int. Cl.
H04N 13/02    (2006.01)
G06K 9/62    (2006.01)
(Continued)

(52) U.S. Cl.
CPC ........... H04N 13/0296 (2013.01); B60R 1/00 (2013.01); G06K 9/6202 (2013.01); G06T 7/593 (2017.01);
(Continued)

(58) Field of Classification Search
CPC ........... H04N 13/0296; H04N 13/0239; H04N 2013/0081; G06T 7/593;
(Continued)

(56) References Cited

U.S. PATENT DOCUMENTS 6,215,898 B1 *  4/2001  Woodfill .................. G06K 9/32
                                                    348/47
6,611,625 B1 *  8/2003  Son ....................... G06T 3/4023
                                                    375/E7.082
(Continued)

FOREIGN PATENT DOCUMENTS

JP    2012-181142       9/2012
JP    2012-198077      10/2012
JP    2015-179063 A    10/2015

OTHER PUBLICATIONS

U.S. Appl. No. 14/628,905, filed Feb. 23, 2015, Zhong, et al.
U.S. Appl. No. 14/628,905, filed Feb. 23, 2015.

Primary Examiner — Jay Patel
Assistant Examiner — Joseph Suh
(74) Attorney, Agent, or Firm — Oblon, McClelland, Maier & Neustadt, L.L.P.

(57) ABSTRACT

An image reducer executes a reduction process on a comparison image to generate a reduced comparison image, and executes a reduction process on a reference image to generate a reduced reference image. A disparity value deriver (a deriving unit) derives a disparity value by setting the minimum value of synthesized costs of pixels in the reduced comparison image in connection with a reference pixel in the reduced reference image, which have been calculated by a cost synthesizer. A disparity image generator generates a reduced disparity image, which is an image obtained by replacing the luminance values of the respective pixels in the reduced reference image with the disparity values corresponding to the pixels. The disparity image enlarger executes an enlargement process for enlarging the image size of the reduced disparity image generated by the disparity image generator to generate a disparity image.

12 Claims, 12 Drawing Sheets

(51) Int. Cl.
  *B60R 1/00* (2006.01)
  *G06T 7/593* (2017.01)
  *H04N 13/00* (2006.01)
  *G06K 9/00* (2006.01)

(52) U.S. Cl.
  CPC .... *H04N 13/0239* (2013.01); *B60R 2300/107* (2013.01); *G06K 9/00805* (2013.01); *G06K 2209/40* (2013.01); *G06T 2207/20016* (2013.01); *G06T 2207/30252* (2013.01); *H04N 2013/0081* (2013.01)

(58) Field of Classification Search
  CPC . G06T 2207/20016; G06T 2207/30252; B60R 1/00; B60R 2300/107; G06K 9/6202; G06K 9/00805; G06K 2209/40
  See application file for complete search history.

(56) References Cited

U.S. PATENT DOCUMENTS

| | | | | |
|---|---|---|---|---|
| 2002/0041327 | A1* | 4/2002 | Hildreth | G06T 7/593 348/42 |
| 2010/0318099 | A1* | 12/2010 | Itkowitz | A61B 19/2203 606/130 |
| 2011/0285813 | A1* | 11/2011 | Girdzijauskas | H04N 13/0011 348/42 |
| 2012/0113219 | A1* | 5/2012 | Chang | H04N 13/0011 348/43 |
| 2012/0155747 | A1* | 6/2012 | Hwang | G06T 7/0075 382/154 |
| 2013/0107207 | A1* | 5/2013 | Zhao | A61B 3/0058 351/206 |
| 2014/0063188 | A1* | 3/2014 | Smirnov | H04N 13/0018 348/43 |
| 2014/0184584 | A1* | 7/2014 | Reif | G06T 7/0075 345/419 |
| 2014/0267630 | A1 | 9/2014 | Zhong | |
| 2015/0077323 | A1* | 3/2015 | Ramaswamy | G06F 3/012 345/156 |
| 2015/0243043 | A1* | 8/2015 | Guan | G06T 7/20 701/1 |
| 2015/0248594 | A1 | 9/2015 | Zhong et al. | |

\* cited by examiner

FIG.7
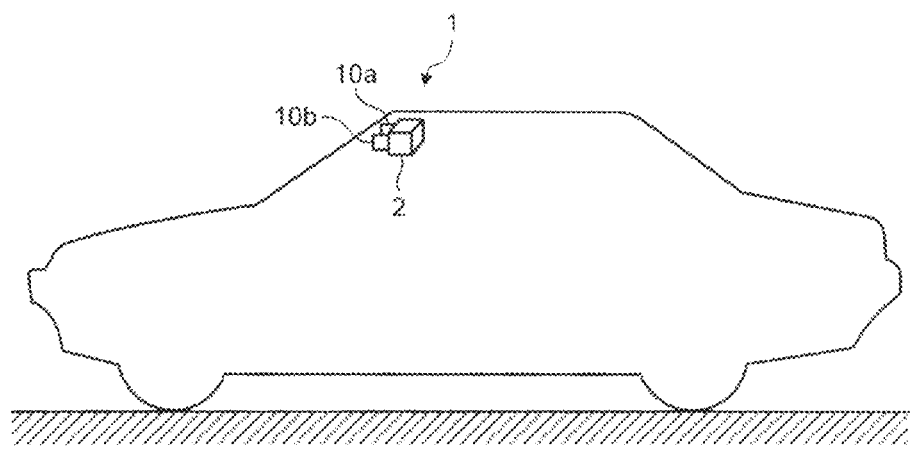
(a)
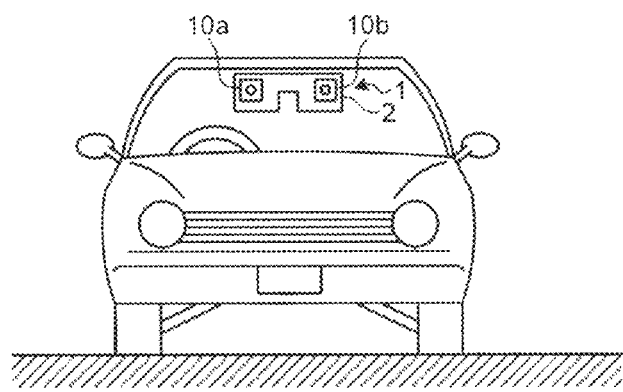
(b)

FIG.16
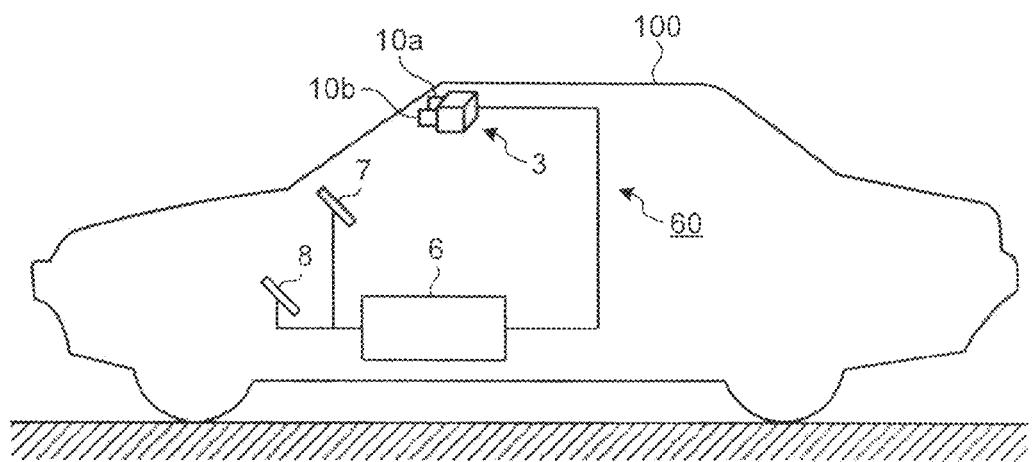
(a)
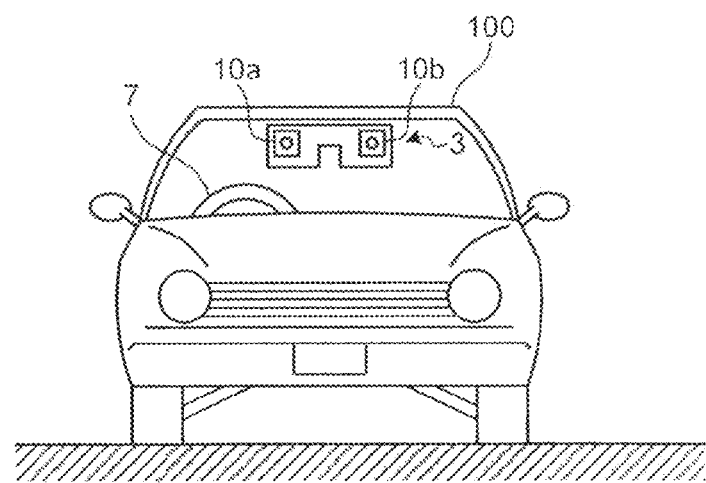
(b)

DISPARITY VALUE DERIVING DEVICE, EQUIPMENT CONTROL SYSTEM, MOVABLE APPARATUS, ROBOT, AND DISPARITY VALUE DERIVING METHOD

CROSS-REFERENCE TO RELATED APPLICATIONS

The present application claims priority to and incorporates by reference the entire contents of Japanese Patent Application No. 2014-082182 filed in Japan on Apr. 11, 2014 and Japanese Patent Application No. 2015-055439 filed in Japan on Mar. 18, 2015.

BACKGROUND OF THE INVENTION

1. Field of the Invention

The present invention relates to a disparity value deriving device, an equipment control system, a movable apparatus, a robot, and a disparity value deriving method.

2. Description of the Related Art

In recent years, vehicle-mounted systems have generally been used for preventing automobile collisions by measuring the distance between automobiles or the distance between an automobile and an obstacle. Methods of measuring the distance include a method based on a stereo matching process using the principle of triangulation using a stereo camera having two cameras.

The stereo matching process is a process of obtaining disparity by matching corresponding regions with each other between a reference image captured by one of the cameras and a comparison image captured by the other camera, and calculating the distance between the stereo camera and an object included in the images from the disparity. The calculation of the distance to an object by this stereo matching process using a stereo camera enables a variety of recognition processing, and brake control and steering control for preventing collisions.

The stereo matching process as described above includes the block matching method in which, in order to evaluate the similarity between images, regions are cut out from the images to be compared and, for example, the sum of absolute differences (SAD) of luminance, the sum of squared differences (SSD), and the zero-mean normalized cross-correlation (ZNCC) are obtained for the regions. However, it is difficult to extract image features in a portion where texture in an image is weak, and the block matching method may not provide accurate disparity. A technique is then proposed as a method for deriving precise disparity, in which not only the cost of a pixel in a comparison image for a corresponding reference pixel in a reference image but also the costs of pixels in the neighborhood of the pixel in the comparison image are aggregated to derive a disparity value for an object with weak texture (see Japanese Patent Application Laid-open No. 2012-181142).

However, the technique disclosed in Japanese Patent Application Laid-open No. 2012-181142 derives disparity values for the entire image obtained by a stereo camera, disadvantageously requiring high memory consumption and involving a heavy image processing load.

SUMMARY OF THE INVENTION

It is an object of the present invention to at least partially solve the problems in the conventional technology.

According to an embodiment, there is provided a disparity value deriving device for deriving a disparity value representing disparity for an object from a first reference image obtained by a first imaging unit for imaging the object and a first comparison image obtained by a second imaging unit for imaging the object, the second imaging unit being located at a different position from the first imaging unit. The disparity value deriving device includes a reducer configured to generate a second reference image and a second comparison image by reducing the first reference image and the first comparison image, respectively, by a first ratio; a calculator configured to calculate degrees of matching of a plurality of regions in a predetermined range in the second comparison image with a first reference region in the second reference image, the predetermined range including a corresponding region that corresponds to the first reference region; a synthesizer configured to obtain a synthesis degree of matching for each of the regions by aggregating the degrees of matching in the second comparison image for a second reference region located in neighborhood of the first reference region, with the degree of matching of the regions; a deriving unit configured to derive the disparity value between the first reference region and the corresponding region, based on the synthesis degrees of matching; a generator configured to generate a first disparity image based on disparity values derived by the deriving unit; and an enlarging unit configured to enlarge the first disparity image by a second ratio to generate a second disparity image, by placing at least one first correction pixel between referential pixels that are consecutive in column and row directions and by placing a second correction pixel in a space generated between consecutive ones of the first correction pixels, the referential pixels being pixels included in the first disparity image.

According to another embodiment, there is provided a disparity value deriving method for deriving a disparity value representing disparity for an object from a first reference image obtained by a first imaging unit for imaging the object and a first comparison image obtained by a second imaging unit for imaging the object, the second imaging unit being located at a different position from the first imaging unit. The disparity value deriving device includes generating a second reference image and a second comparison image by reducing the first reference image and the first comparison image, respectively, by a first ratio; calculating degrees of matching of a plurality of regions in a predetermined range in the second comparison image with a first reference region in the second reference image, the predetermined range including a corresponding region that corresponds to the first reference region; obtaining a synthesis degree of matching for each of the regions by aggregating the degrees of matching in the second comparison image for a second reference region located in neighborhood of the first reference region, with the degree of matching of the regions; deriving the disparity value between the first reference region and the corresponding region, based on the synthesis degrees of matching; generating a first disparity image based on disparity values derived by the deriving unit; and enlarging the first disparity image by a second ratio to generate a second disparity image, by placing at least one first correction pixel between referential pixels that are consecutive in column and row directions and by placing a second correction pixel in a space generated between consecutive ones of the first correction pixels, the referential pixels being pixels included in the first disparity image.

According to still another embodiment, there is provided a disparity value deriving device for deriving a disparity value indicating disparity for an object, based on a reference image obtained by imaging the object from a first imaging position and a comparison image obtained by imaging the object from a second imaging position different from the first imaging position, and for outputting the disparity value to an object recognition device configured to recognize the object in the reference image. The disparity value deriving device includes a generator configured to generate a reduced disparity image having a smaller size than the reference image and the comparison image, based on the disparity value and based on the reference image and the comparison image; and an enlarging unit configured to generate an enlarged disparity image by enlarging the reduced disparity image through at least one of a first enlargement process and a second enlargement process. The first enlargement process and the second enlargement process are such that with regard to an object near the first imaging position and the second imaging position, a region corresponding to the object as recognized by the object recognition device in the enlarged disparity image output through the second enlargement process is larger than a region corresponding to the object as recognized by the object recognition device in the enlarged disparity image output through the first enlargement process, and with regard to an object far from the first imaging position and the second imaging position, a region corresponding to the object as recognized by the object recognition device in the enlarged disparity image output through the second enlargement process is smaller than a region corresponding to the object as recognized by the object recognition device in the enlarged disparity image output through the first enlargement process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 illustrates an automobile equipped with a disparity value deriving device according to an embodiment of the present invention;

FIG. 16 illustrates an example of an equipment control system according to the present embodiment mounted on a vehicle.

DETAILED DESCRIPTION OF THE PREFERRED EMBODIMENT

Embodiments of the present invention will be described below with reference to the accompanying drawings.

Overview of Distance Measurement Method Using SGM Method

Referring first to FIG. 1 to FIG. 6, an overview of a distance measurement method using the semi-global matching (SGM) method will be described. The SGM method is disclosed in Accurate and Efficient Stereo Processing by Semi-Global Matching and Mutual Information) and a brief explanation is given below.

Principle of Distance Measurement

Figure 1:
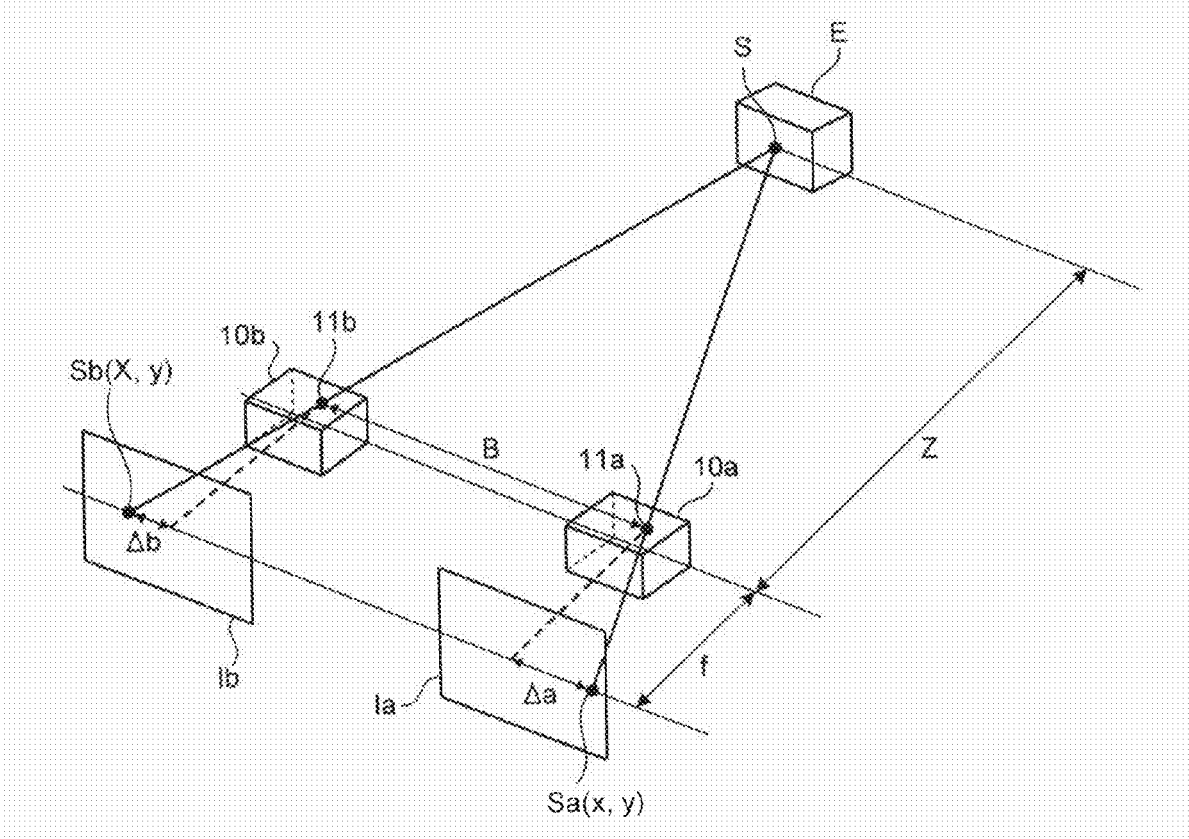
FIG. 1 is an illustration of the principle of deriving the distance from an imaging device to an object.
Figure 2:
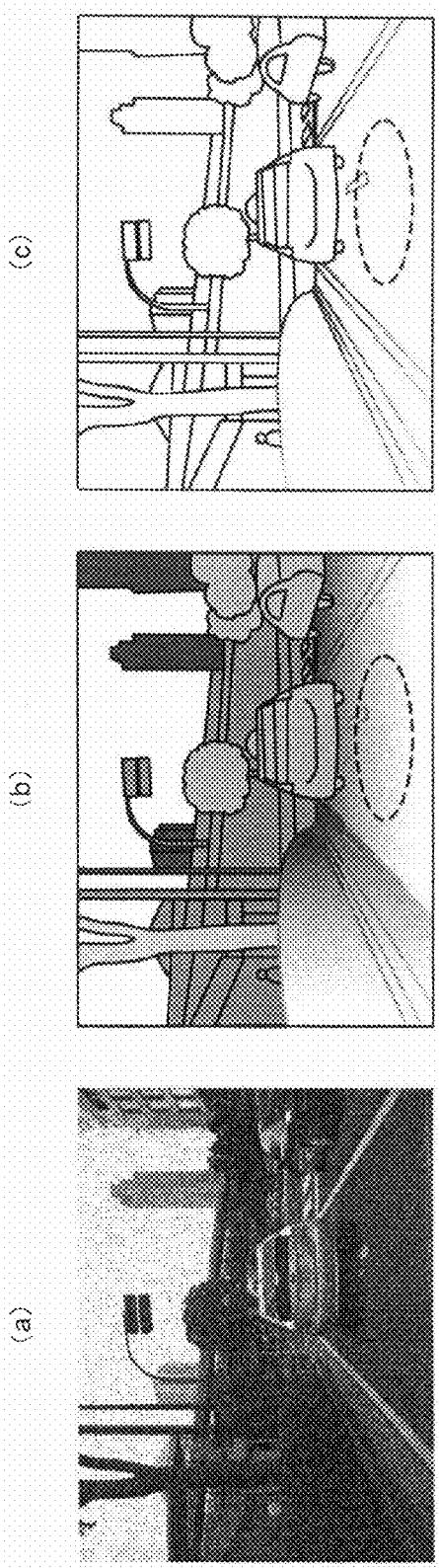
FIG. 2 illustrates (a) an example of a reference image, (b) an example of a high density disparity image, and (c) an example of an edge disparity image.

Referring to FIG. 1, the principle of measuring the distance from a stereo camera to an object will be described, in which disparity of the object is derived as a disparity value by conducting stereo imaging using the stereo camera, and the disparity value is used to measure the distance from the stereo camera to the object. FIG. 1 is an illustration of the principle of deriving the distance from imaging devices to an object. The following description explains processes with respect to each single pixel rather than with respect to each predetermined region including a plurality of pixels, to make the explanation simpler. When the process is performed not in units of single pixels but in units of predetermined regions each including a plurality of pixels, the predetermined region that includes a reference pixel is denoted as a reference region, and the predetermined region that includes a corresponding pixel is denoted as a corresponding region. The reference region may include a reference pixel alone and the corresponding region may include a corresponding pixel alone.

Disparity Value Calculation

The images captured by an imaging device 10a and an imaging device 10b illustrated in FIG. 1 are denoted as a reference image Ia and a comparison image Ib, respectively. In FIG. 1, the imaging device 10a and the imaging device 10b are installed parallel and at the same height. In FIG. 1, a point S on an object E in a three-dimensional space is captured at one position of the imaging device 10a and also at one position of the imaging device 10b, wherein these two positions are on the same horizontal line of the imaging device 10a and the imaging device 10b. That is, the point S in each image is captured at a point Sa(x,y) in the reference image Ia and a point Sb(x,y) in the comparison image Ib. Here, the disparity value Δ is expressed as Equation (1) using Sa(x,y) in the coordinates of the imaging device 10a and Sb(X,y) in the coordinates of the imaging device 10b.

$$\Delta = X - x \tag{1}$$

Here, as in the case of FIG. 1, the disparity value is written as $\Delta = \Delta a + \Delta b$, where $\Delta a$ is the distance between the point Sa(x,y) in the reference image Ia and the point of intersection of the normal extending from the imaging lens 11a to the imaging surface, and $\Delta b$ is the distance between the point Sb(X,y) in the comparison image Ib and the point of intersection of the normal extending from the imaging lens 11b to the imaging surface.

Distance Calculation

The distance Z from the imaging devices 10a, 10b to the object E can be derived using the disparity value Δ. Specifically, the distance Z is the distance from the plane including the focus position of the imaging lens 11a and the focus position of the imaging lens 11b to a particular point S on the object E. As illustrated in FIG. 1, the distance Z can be calculated by Equation (2) using the focal length f of the imaging lens 11a and the imaging lens 11b, the base line length B that is the length between the imaging lens 11a and the imaging lens 11b, and the disparity value Δ.

$$Z = (B \times f)/\Delta \qquad (2)$$

From Equation (2), the greater the disparity value Δ is, the smaller the distance Z is, and the smaller the disparity value Δ is, the greater the distance Z is.

SGM Method

Referring now to FIG. 2 to FIG. 6, a distance measurement method using the SGM method will be described. FIG. 2(a) is a conceptual diagram illustrating a reference image, FIG. 2(b) is a conceptual diagram illustrating a high density disparity image for FIG. 2(a), and FIG. 2(c) is a conceptual diagram illustrating an edge disparity image for FIG. 2(a). Here, the reference image is an image representing an object by luminance. The high density disparity image is an image that is derived from the reference image by the SGM method and represents the disparity value at each set of coordinates in the reference image. The edge disparity image is an image that is derived by the conventionally used block matching method and represents the disparity values only at a part with relatively strong texture such as an edge in the reference image.

The SGM method is a method of deriving the disparity values appropriately even for an object with weak texture and deriving the high density disparity image illustrated in FIG. 2(b) based on the reference image illustrated in FIG. 2(a). When the block matching method is used, the edge disparity image illustrated in FIG. 2(c) is derived based on the reference image illustrated in FIG. 2(a). As can be understood by comparing the ovals enclosed by the broken lines in FIG. 2(b) and FIG. 2(c), compared with the edge disparity image, the high density disparity image can represent detailed information such as a road with weak texture and therefore enables distance measurement in more detail.

In the SGM method, a disparity value is derived by calculating a cost and thereafter further calculating a synthesized cost that is synthesized dissimilarity, rather than deriving a disparity value immediately after calculating a cost that is dissimilarity. In this method, a disparity image (here, high density disparity image) representing disparity values in almost all the pixels is finally derived. The block matching method is the same as the SGM method in that a cost is calculated. However, unlike the SGM method, the disparity values only at a part with relatively strong texture such as an edge are derived without synthesized costs being calculated.

Calculation of Cost

Figure 3:
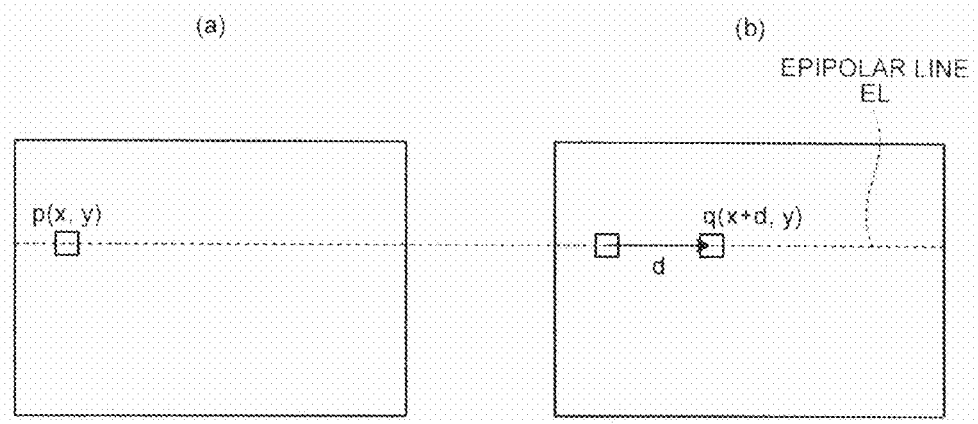
FIG. 3 illustrates a calculation of a shift amount while successively shifting candidates for a corresponding pixel in a comparison image relative to a reference image.
Figure 4:
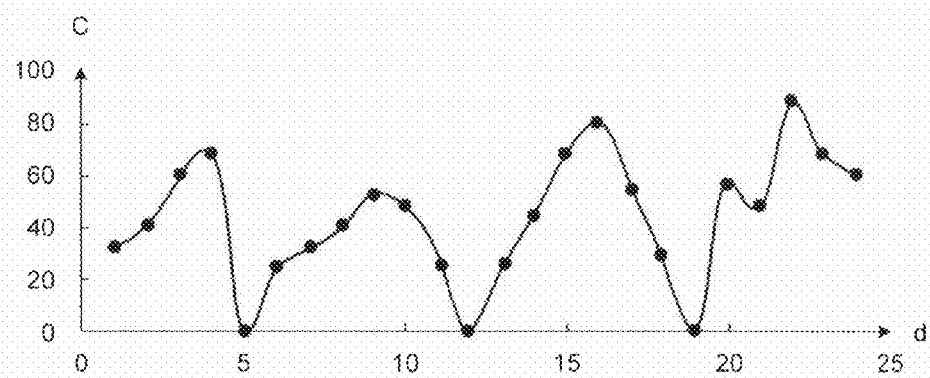
FIG. 4 is a graph illustrating costs with respect to shift amounts.

Referring first to FIG. 3 and FIG. 4, a method of calculating a cost C(p,d) will be described. FIG. 3(a) is a conceptual diagram illustrating a reference pixel in a reference image and FIG. 3(b) is a conceptual diagram of calculating costs while successively shifting (displacing) candidates for the corresponding pixel in a comparison image relative to the reference pixel in (a). FIG. 4 is a graph illustrating costs with respect to shift amounts. Here, the corresponding pixel is a pixel in the comparison image that is the most similar to the reference pixel in the reference image. In the following description, it is assumed that C(p,d) represents C(x,y,d).

As illustrated in FIG. 3(a), the cost C(p,d) of each candidate corresponding pixel q(x+d,y) that corresponds to the reference pixel p(x,y) is calculated based on the luminance values of a predetermined reference pixel p(x,y) in the reference image and of a plurality of candidate corresponding pixels q(x+d,y) on the epipolar line EL in the comparison image that corresponds to the reference pixel p(x,y). The variable d is a shift amount (displacement amount) of each candidate q for the corresponding pixel from the reference pixel p, and a shift amount is expressed in units of pixels in the present embodiments. That is, in FIG. 3, the cost C(p,d) that is dissimilarity in luminance value between a candidate corresponding pixel q(x+d,y) and the reference pixel p(x,y) is calculated while successively shifting the candidate corresponding pixels q(x+d,y) one pixel by one pixel in a predetermined range (for example, 0<d<25). A known method such as SAD (Sum of Absolute Difference) is applied as the method of calculating the cost C where the cost C denotes dissimilarity.

As illustrated in FIG. 4, the cost C(p,d) thus calculated can be expressed by a graph of a cost curve that is a set of the costs C with respect to shift amounts d. In FIG. 4, since the cost C is zero when the shift amount d=5, 12, 19, the minimum value cannot be obtained. In the case of an object with weak texture, it is thus difficult to obtain the minimum value of the cost C.

Calculation of Synthesized Cost

Figure 5:
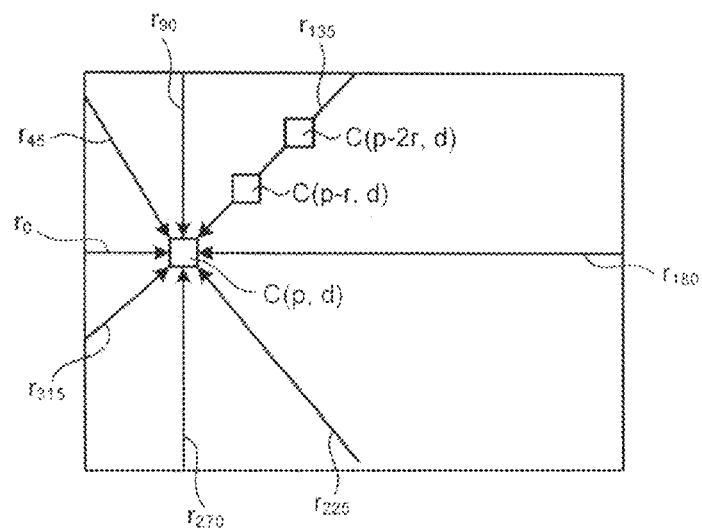
FIG. 5 is a conceptual diagram for deriving a synthesized cost.
Figure 6:
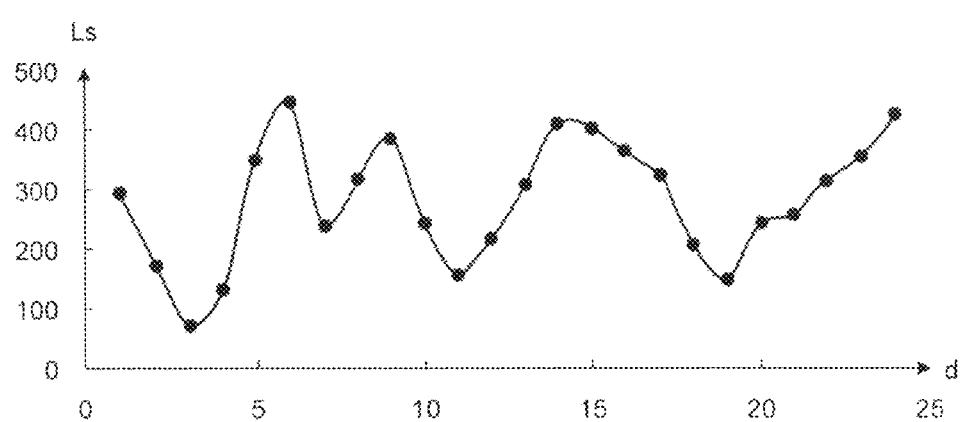
FIG. 6 is a graph illustrating synthesized costs with respect to disparity values.

Referring now to FIG. 5 and FIG. 6, the method of calculating a synthesized cost Ls(p,d) will be described. FIG. 5 is a conceptual diagram for deriving a synthesized cost. FIG. 6 is a graph of a synthesized-cost curve illustrating synthesized costs with respect to disparity values.

In the method of calculating a synthesized cost in the present embodiments, the cost C(p,d) in the reference pixel p(x,y) is calculated, and costs for each one of pixels $p(x_n,y_n)$ existing near to far positions from the reference pixel p(x,y) is also calculated as costs C for each one of another reference pixels $p(x_n,y_n)$. With this configuration, the synthesized cost Ls(p,d) for the reference pixel p(x,y) is calculated by aggregating the calculated cost C(p,d) for the reference pixel p(x,y) and the calculated costs C for other reference pixels $p(x_n,y_n)$ existing near to far positions from the reference pixel p(x,y). Similarly, the synthesized cost Ls for each one of reference pixels $p(x_n,y_n)$ is calculated by aggregating the calculated cost C for one reference pixel $p(x_n,y_n)$ and the calculated costs C for other reference pixels existing near to far positions from the reference pixel $p(x_n,y_n)$.

The method of calculating a synthesized cost will now be described in more detail. In order to calculate the synthesized cost Ls(p,d), first, it is necessary to calculate a path cost Lr(p,d). Equation (3) is an equation for calculating the path cost Lr(p,d), and Equation (4) is an equation for calculating the synthesized cost Ls.

$$Lr(p,d) = C(p,d) + \min\{(Lr(p-r,d), Lr(p-r,d-1)+P1, Lr(p-r,d+1)+P1, Lr\min(p-r)+p2\} \qquad (3)$$

Here, in Equation (3), r denotes a direction vector in the aggregation direction and has two components of the x direction and the y direction. The term min{ } is a function for obtaining the minimum value. Lrmin(p−r) denotes the minimum value of Lr(p−r,d) when the shift amount d is changed in the coordinates in which p is shifted by one pixel in r direction. The path cost Lr is recurrently applied as expressed in Equation (3). P1 and P2 are fixed parameters set by experiment in advance such that the disparity values Δ of adjacent reference pixels on the path are likely to be continuous. For example, P1=48, P2=96. As expressed in Equation (3), the path cost Lr(p,d) is obtained by adding the minimum value of the path cost Lr of each pixel in the pixels in r direction illustrated in FIG. 5 to the cost C in the reference pixel p(x,y). As described above, in order to obtain Lr at each pixel in r direction, Lr is obtained first from the endmost pixel in r direction of the reference pixel p(x,y), and Lr is obtained along r direction. As illustrated in FIG. 5, $Lr_0$, $Lr_{45}$, $Lr_{90}$, $Lr_{135}$, $Lr_{180}$, $Lr_{225}$, $Lr_{270}$, $Lr_{315}$ in eight directions are obtained, and the synthesized cost Ls is eventually obtained based on Equation (4).

$$Ls(p, d) = \sum_8 Lr \quad (4)$$

The synthesized cost Ls(p,d) thus calculated can be represented by a graph of a synthesized-cost curve representing the synthesized cost Ls(p,d) with respect to the shift amount d, as illustrated in FIG. 6. In FIG. 6, the synthesized cost Ls has the minimum value when the shift amount d=3 and therefore is calculated as the disparity value Δ=3. Although the number of r is eight in the foregoing description, the number is not limited thereto. For example, the eight directions may be further divided by two into 16 directions or by three into 24 directions. Although being expressed as "dissimilarity", the cost C may be expressed as "similarity" that is a reciprocal of dissimilarity. In this case, a known method such as NCC (Normalized Cross Correlation) is applied as the method of calculating the cost C. In this case, the disparity value Δ not with the minimum but with the "maximum" synthesized cost Ls is derived. The similarity and the dissimilarity may be inclusively denoted as "matching degree".

Specific Description of Present Embodiments

Specific descriptions of the present embodiments are given below with reference to the drawings. Here, an object recognition system 1 mounted on an automobile will be described. The object recognition system 1 may be mountable not only on an automobile as an example of a vehicle but also on a motor bicycle, a bicycle, a wheelchair, and an agricultural cultivator as other examples of a vehicle. The object recognition system 1 may be mountable not only on a vehicle as an example of a movable apparatus but also on a robot as another example of a movable apparatus. The robot may not be a movable apparatus but may be an apparatus such as an industrial robot fixedly installed in FA (Factory Automation). The apparatus fixedly installed may not be a robot but may be a security monitoring camera.

Configuration of Embodiment

First, the overall configuration of each of the present embodiments will be described with reference to FIG. 7 to FIG. 9.

External Configuration

Figure 8:
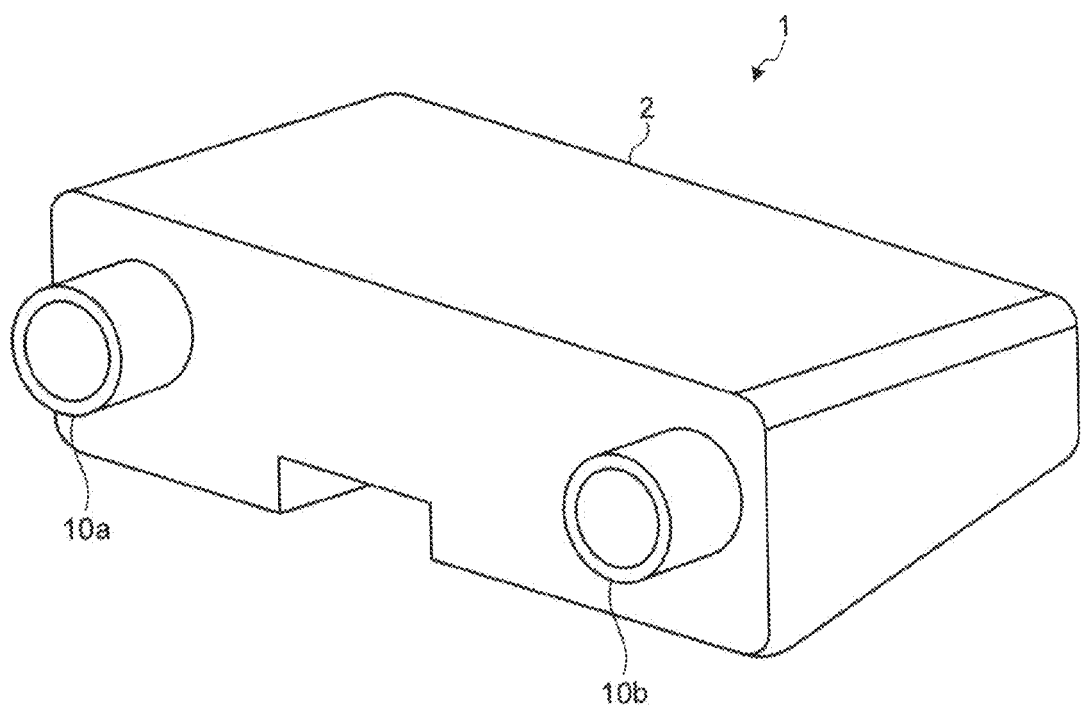
FIG. 8 is a schematic diagram of the object recognition system.

With reference to FIG. 7 and FIG. 8, an external configuration of the object recognition system 1 in the present embodiments will be described. FIG. 7(a) is a schematic diagram depicting a side of an automobile equipped with the object recognition system according to an embodiment of the present invention and FIG. 7(b) is a schematic diagram depicting the front of the automobile. FIG. 8 is a schematic diagram of the object recognition system.

As illustrated in FIGS. 7(a) and 7(b), the object recognition system 1 in the present embodiments includes an imaging device 10a (first imaging unit) and an imaging device 10b (second imaging unit). The imaging device 10a and the imaging device 10b are installed (first imaging position, second imaging position) so as to be able to image the scene ahead in the direction in which the automobile travels. As illustrated in FIG. 8, the object recognition system 1 includes a main body 2 and a pair of cylindrical imaging device 10a and imaging device 10b provided on the main body 2.

Overall Hardware Configuration

Figure 9:
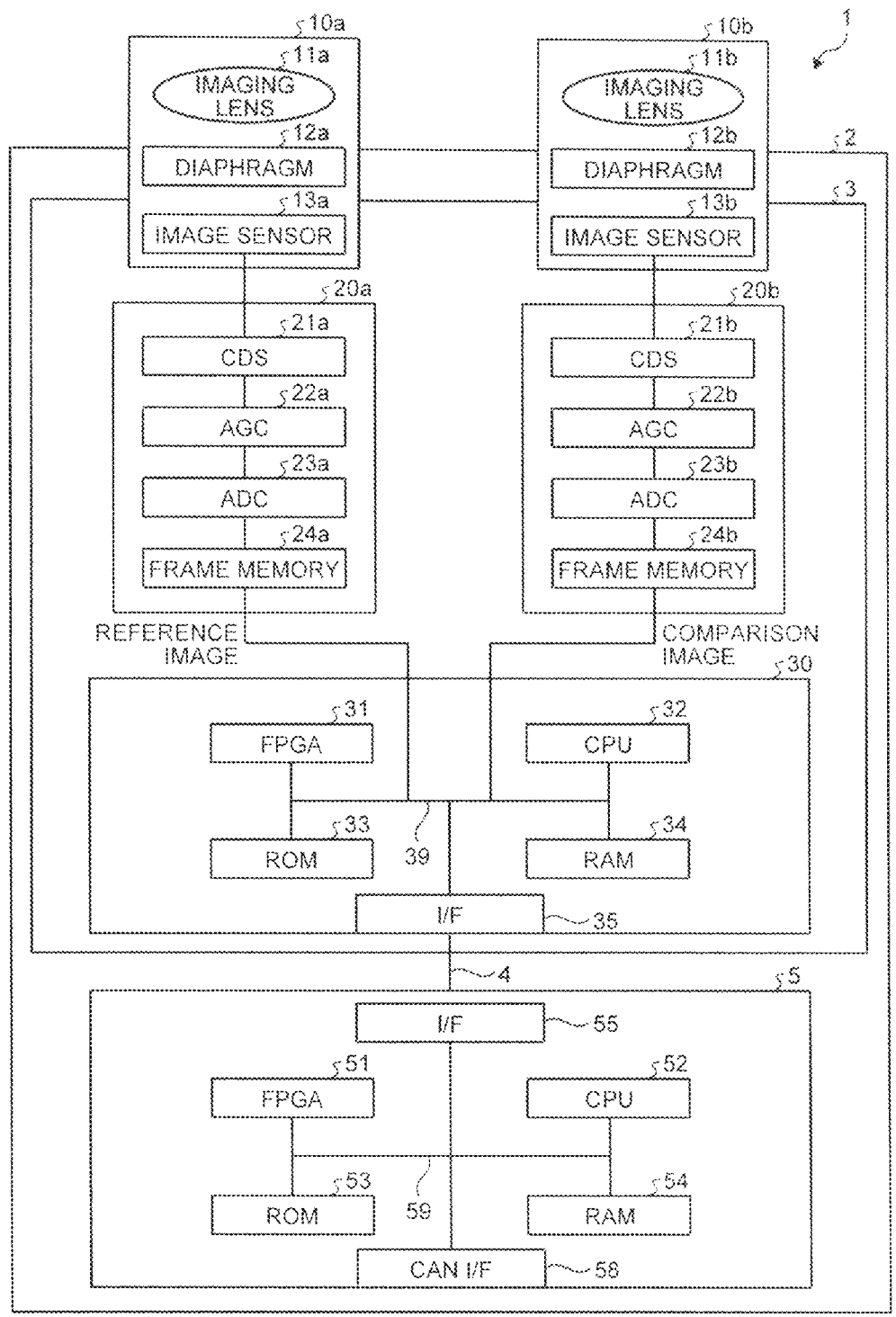
FIG. 9 is an overall hardware configuration diagram of the object recognition system.

Referring now to FIG. 9, an overall hardware configuration of the object recognition system 1 will be described. FIG. 9 is a hardware configuration diagram of the object recognition system as a whole.

As illustrated in FIG. 9, the object recognition system 1 includes a disparity value deriving device 3 and an object recognition device 5 in the main body 2.

The disparity value deriving device 3 derives a disparity value Δ indicating disparity for an object E from a plurality of images obtained by imaging the object E and outputs a high density disparity image indicating the disparity value Δ in each pixel. The object recognition device 5 performs processing such as measuring the distance from the imaging devices 10a, 10b to the object E, based on the high density disparity image output from the disparity value deriving device 3.

Here, a hardware configuration of the disparity value deriving device 3 will be described first. As illustrated in FIG. 9, the disparity value deriving device 3 includes the imaging device 10a, the imaging device 10b, a signal conversion device 20a, a signal conversion device 20b, and an image processing device 30.

The imaging device 10a generates an analog signal representing an image by imaging the scene ahead and includes an imaging lens 11a, a diaphragm 12a, and an image sensor 13a.

The imaging lens 11a is an optical element for diffracting light passing through the imaging lens 11a to form an image of an object. The diaphragm 12a cuts off part of light passing through the imaging lens 11a to adjust the quantity of light input to the image sensor 13a described later. The image sensor 13a is a semiconductor device that converts light input from the imaging lens 11a and the diaphragm 12a into an electrical analog image signal and is implemented, for example, by a charge coupled device (CCD) or a complementary metal oxide semiconductor (CMOS). The imaging device 10b has the same configuration as the imaging device 10a, and a description of the imaging device 10b is omitted. The imaging lens 11a and the imaging lens 11b are installed such that their respective lens surfaces are on the same plane.

The signal conversion device 20a converts an analog signal representing the captured image into image data in digital format, and includes a correlated double sampling (CDS) 21a, an auto gain control (AGC) 22a, an analog digital converter (ADC) 23a, and a frame memory 24a.

The CDS 21a removes noise by correlated double sampling from the analog image signal converted by the image sensor 13a. The AGC 22a performs gain control of controlling the intensity of the analog image signal having noise removed by the CDS 21a. The ADC 23a converts the analog image signal gain-controlled by the AGC 22a into image data in digital format. The frame memory 24a stores the image data converted by the ADC 23a.

Similarly, the signal conversion device 20b obtains image data from the analog image signal converted by the imaging device 10b and includes a CDS 21b, an AGO 22b, an ADC 23b, and a frame memory 24b.

The CDS 21b, the AGC 22b, the ADC 23b, and the frame memory 24b have the same configuration as the CDS 21a, the AGC 22a, the ADC 23a, and the frame memory 24a, respectively, and a description thereof is omitted.

The image processing device 30 is a device for processing image data converted by the signal conversion device 20a and the signal conversion device 20b. The image processing device 30 includes a field programmable gate array (FPGA) 31, a central processing unit (CPU) 32, a read only memory (ROM) 33, a random access memory (RAM) 34, an interface (I/F) 35, and a bus line 39 such as an address bus and a data bus for electrically connecting the components 31 to 35 as illustrated in FIG. 9.

The FPGA 31 is an integrated circuit and performs the process of calculating a disparity value Δ in the image represented by image data in accordance with an instruction from the CPU 32. The CPU 32 controls each function in the disparity value deriving device 3. The ROM 33 stores an image processing program for the CPU 32 to execute to control each function in the disparity value deriving device 3. The RAM 34 is used as a work area for the CPU 32. The I/F 35 is an interface for communicating with the I/F 55 of the object recognition device 5 described later through the bus line 4 such as an address bus and a data bus.

A hardware configuration of the object recognition device 5 will now be described. As illustrated in FIG. 9, the object recognition device 5 includes an FPGA 51, a CPU 52, a ROM 53, a RAM 54, an I/F 55, a controller area network (CAN) I/F 58, and a bus line 59 such as an address bus and a data bus for electrically connecting the components 51 to 55, 58 as illustrated in FIG. 9.

The FPGA 51, the CPU 52, the ROM 53, the RAM 54, the I/F 55, and the bus line 59 have the same configuration as the FPGA 31, the CPU 32, the ROM 33, the RAM 34, the I/F 35, and the bus line 39, respectively, in the image processing device 30 and a description thereof is omitted. The I/F 55 is an interface for communicating with the I/F 35 in the image processing device 30 through the bus line 4. The ROM 53 stores an object recognition program for the CPU 52 to execute to control each function in the object recognition device 5. The CAN I/F 58 is an interface for communicating with, for example, an external controller and can be connected to, for example, a controller area network (CAN) of the automobile.

In such a configuration, when a high density disparity image is transmitted from the I/F 35 of the image processing device 30 to the object recognition device 5 through the bus line 4, the FPGA 51 calculates the distance Z from the imaging devices 10a, 10b to an object E according to an instruction from the CPU 52 in the object recognition device 5.

The FPGA 31 may calculate the distance Z under an instruction from the CPU 32 of the image processing device 30, rather than the FPGA 51 calculating the distance Z under an instruction from the CPU 52 in the object recognition device 5.

The programs described above may be recorded in an installable or executable file format on a computer-readable storage medium to be distributed. Examples of the storage medium include a compact disc read only memory (CD-ROM) and a secure digital (SD) memory card.

Figure 10:
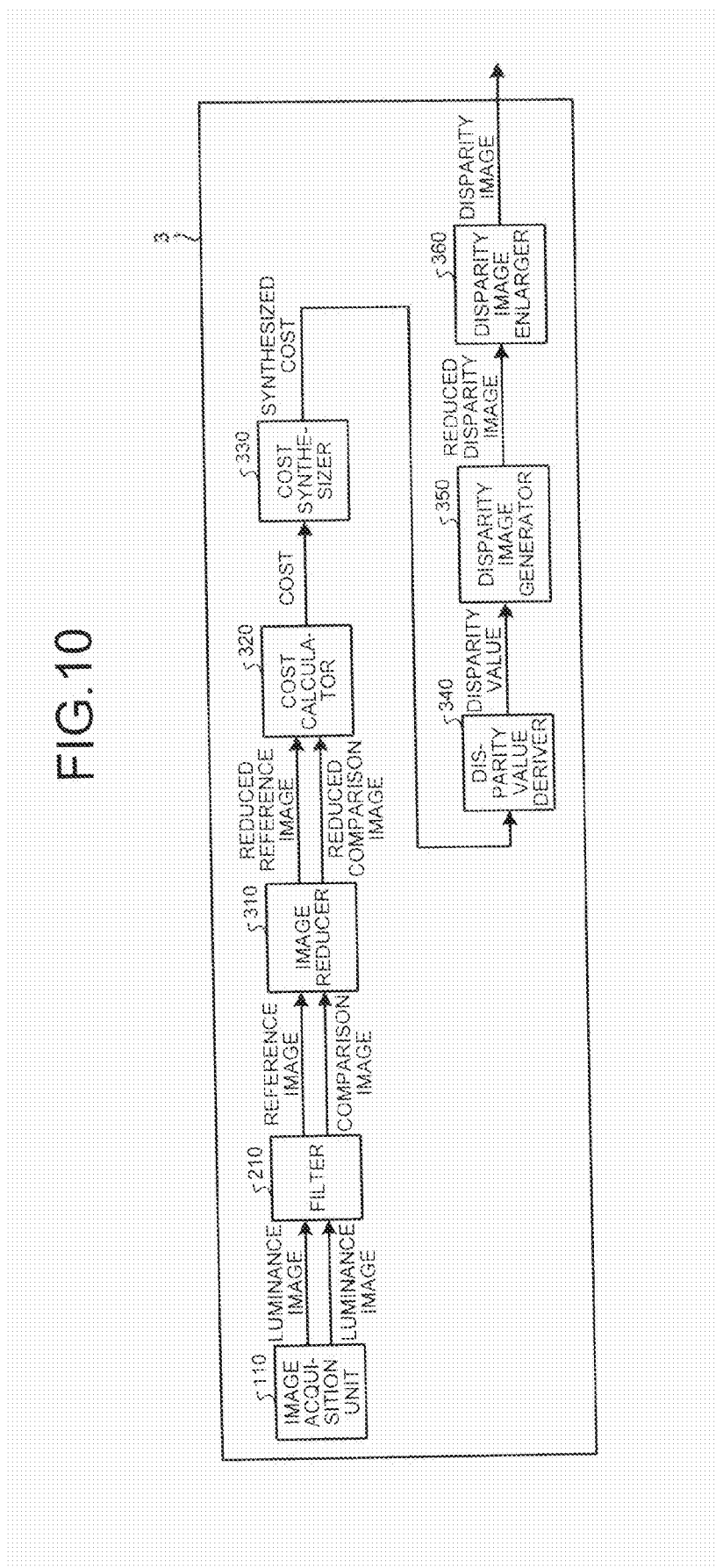
FIG. 10 is a diagram illustrating an example of the block configuration of a disparity value deriving device according to the present embodiment.
Figure 11:
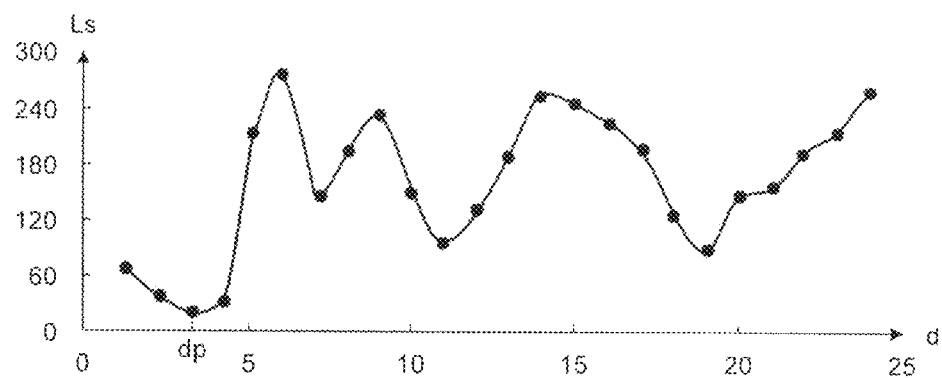
FIG. 11 is a graph illustrating an example of the relation between the shift amounts and the synthesized costs in the present embodiment.
Figure 12:
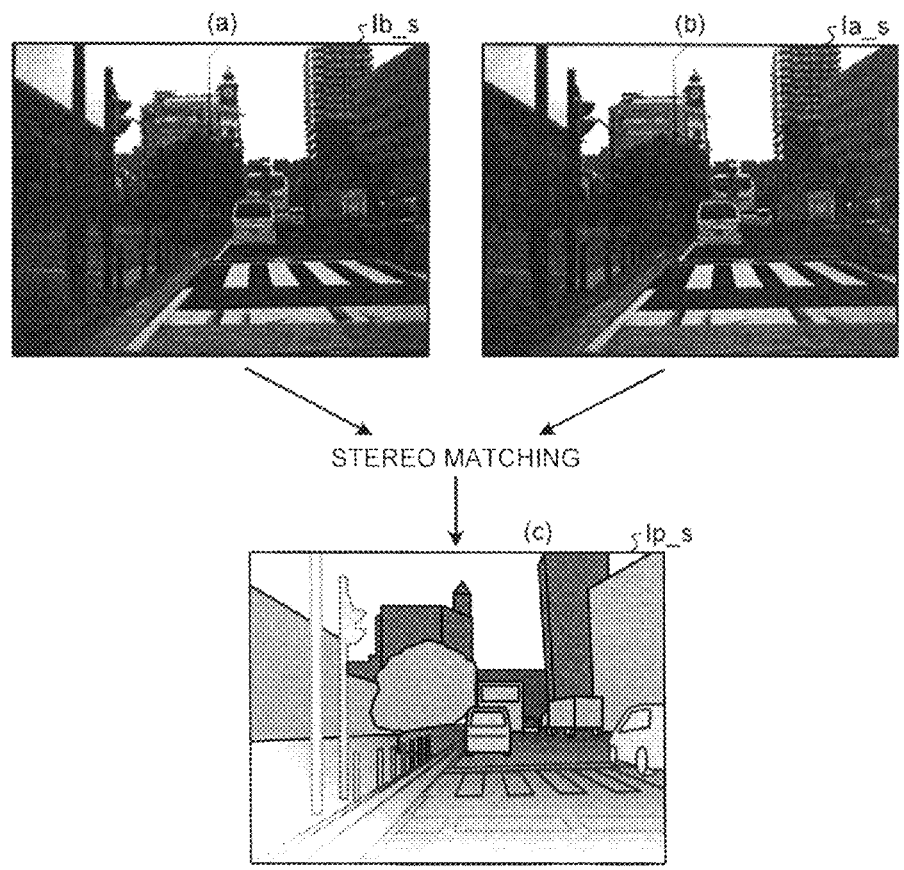
FIG. 12 is a diagram explaining how a reduced disparity image is obtained through a stereo matching process.
Figure 13:
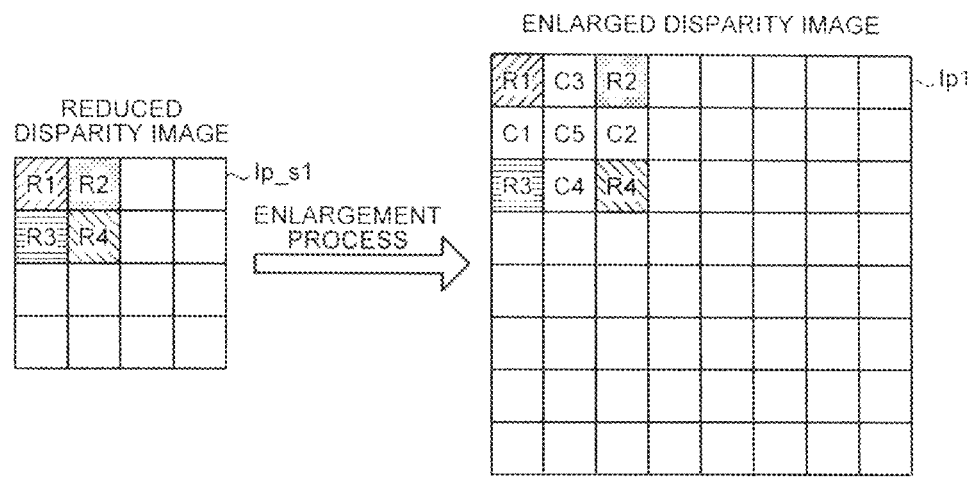
FIG. 13 is a diagram explaining an enlargement process to be performed on a reduced disparity image.
Figure 14:
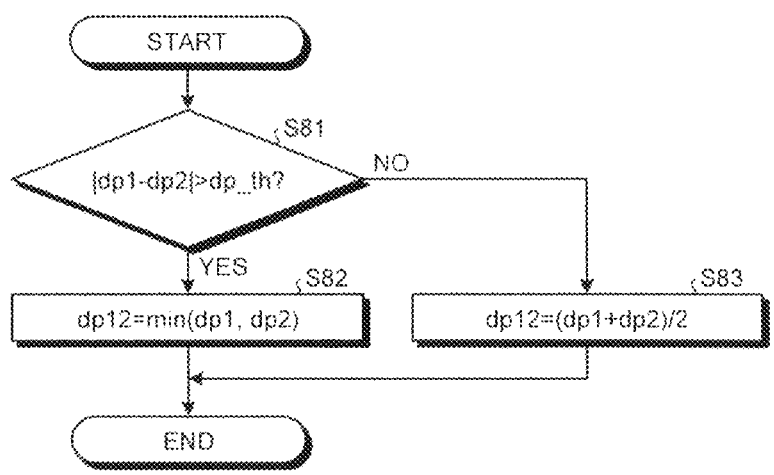
FIG. 14 is a flowchart illustrating an example of operation for obtaining disparity values of correction pixels.

Block Configuration of Disparity Value Deriving Device and Operation of Each Block FIG. 10 is a diagram illustrating an example of the block configuration of the disparity value deriving device according to the present embodiment. FIG. 11 is a graph illustrating an example of the relation between the shift amounts and the synthesized costs in the present embodiment. FIG. 12 is a diagram explaining how a reduced disparity image is obtained through a stereo matching process according to the present embodiment. FIG. 13 is a diagram explaining an enlargement process to be performed on a reduced disparity image. FIG. 14 is a flowchart illustrating an example of operation for obtaining disparity values of correction pixels. Referring to FIG. 10 to FIG. 16, a block configuration of the principal part of the disparity value deriving device 3 and the operation of each block will be described. The imaging device 10a and the imaging device 10b illustrated in FIG. 8 described above are referred to as the "right camera" and the "left camera", respectively, for convenience of explanation.

As illustrated in FIG. 10, the disparity value deriving device 3 includes an image acquisition unit 110, a filter 210, an image reducer 310, a cost calculator 320, a cost synthesizer 330, a disparity value deriver 340 (a deriving unit), a disparity image generator 350, and a disparity image enlarger 360 (an enlarging unit).

The image acquisition unit 110 is a processing unit that images an object with the two, left and right cameras and generates analog image signals to obtain two luminance images that are images based on the respective image signals. The image acquisition unit 110 is implemented by the imaging device 10a and the imaging device 10b illustrated in FIG. 9.

The filter 210 is a processing unit to remove noise from the image signals of the two luminance images obtained by the image acquisition unit 110, convert the image signals into digital image data, and output the converted digital image data. Here, out of the image data of the two luminance images (hereinafter simply referred to as "luminance images") output by the filter 210, are set as the image data of the reference image Ia (hereinafter simply referred to as "reference image Ia") captured by the right camera (imaging device 10a) of the image acquisition unit 110 and as the image data of the comparison image Ib (hereinafter simply referred to as "comparison image Ib") captured by the left camera (imaging device 10b). That is, the filter 210 outputs the reference image Ia (a first reference image) and the comparison image Ib (a first comparison image) based on the two luminance images output from the image acquisition unit 110. The filter 210 is implemented by the signal converters 20a, 20b illustrated in FIG. 9.

The image reducer 310 executes a reduction process for reducing the image sizes of the comparison image Ib and the reference image Ia that have been output from the filter 210. Specifically, the image reducer 310 executes the reduction process on the comparison image Ib to generate a reduced comparison image Ib_s (a second comparison image), and executes the reduction process on the reference image Ia to generate a reduced reference image Ia_s (a second reference image). Here, a known reduction algorithm such as the average pixel method, the Lanczos method, or a bilinear interpolation method can be used for the reduction process. The image reducer 310 is implemented by the FPGA 31 illustrated in FIG. 9.

The cost calculator 320 calculates the cost C(p,d) of each candidate pixel q(x+d,y), based on the luminance value of the reference pixel p(x,y) (a first reference region) in the reduce reference image Ia_s and the luminance value of each of the candidate pixels q(x+d,y) (candidate regions) for the corresponding pixel that are specified by shifting positions by shift amounts d from the pixel corresponding to the position of the reference pixel p(x,y) on the Epipolar line in the reduced comparison image Ib_s based on the reference pixel p(x,y). The cost calculator 320 is implemented by the FPGA 31 illustrated in FIG. 9. The cost C calculated by the cost calculator 320 is, for example, SAD or SSD. The graph in FIG. 11 illustrates the relation between the shift amounts d and the costs C calculated by the cost calculator 320. Thus, the cost calculator 320 calculates the costs C using the reduced comparison image Ib_s and the reduced reference image Ia_s having image sizes reduced, instead of using the comparison image Ib and the reference image Ia before the reduction process by the image reducer 310. The processing load for calculating the costs C can be reduced, and the consumption of memory (the RAM 34 illustrated in FIG. 9) can be thus reduced.

As described above, a graph representing the relation between the shift amounts d and costs C calculated by the cost calculator 320 (for example, the graph illustrated FIG. 4 described above) gives values approximating the minimum value of the costs C at two or more of the shift amounts d. For this reason, it is difficult to obtain the minimum value of the costs C to find the corresponding pixel in the reduced comparison image Ib_s that corresponds to the reference pixel in the reduced reference image Ia_s. Particularly when an image includes a portion with weak texture, it is thus difficult to obtain the minimum value of the costs C.

Using pixels in the neighborhood of the reference pixel p(x,y) in the reduced reference image Ia_s as reference pixels, the cost synthesizer 330 calculates the synthesized cost Ls(p,d) (a synthesis degree of matching) of the candidate pixel q(x+d,y) by aggregating the costs C of the pixels in the reduced comparison image Ib_s for these reference pixels (second reference regions), with the cost C(p,d) of the candidate pixel q(x+d,y) calculated by the cost calculator 320. The cost synthesizer 330 is implemented by the FPGA 31 illustrated in FIG. 9.

Specifically, in order to calculate the synthesized cost Ls, first, the cost synthesizer 330 calculates the path cost Lr(p,d) in a predetermined direction of r by (Equation 3) above. In this case, Lr(p−r,k) in (Equation 3) represents the path costs Lr when shift amounts for the pixel at the coordinates one pixel shifted in the direction of r from the coordinates of the reference pixel p are varied. Next, the cost synthesizer 330 calculates the path costs Lr in eight directions, that is, $Lr_0$, $Lr_{45}$, $Lr_{90}$, $Lr_{180}$, $Lr_{225}$, $Lr_{270}$, and $Lr_{315}$ as illustrated in FIG. 5 and finally calculates the synthesized cost Ls(p,d) based on Equation (4). The graph in FIG. 11 represents the relation between the shift amounts d and the synthesized costs Ls calculated by the cost synthesizer 330. As illustrated in FIG. 11, the minimum value of the synthesized costs Ls is obtained when the shift amount d=3. Thus, the cost synthesizer 330 calculates the synthesized costs Ls using the costs C calculated by the cost calculator 320 using the reduced comparison image Ib_s and the reduced reference image Ia_s having image sizes reduced, instead of using the shift amounts d shifted in units of pixels. More specifically, the cost synthesizer 330 is configured not to calculate the synthesized costs Ls using the costs C calculated using the comparison image Ib and the reference image Ia before the reduction process. In this manner, the processing load for calculating the synthesized costs Ls can be reduced, and the consumption of memory (the RAM 34 illustrated in FIG. 9) can be reduced.

As illustrated in FIG. 11, the disparity value deriver 340 drives a disparity value Δ by assuming, as disparity value Δ, the minimum value (an extreme) of the synthesized costs Ls of pixels in the reduced comparison image Ib_s for the reference pixel in the reduced reference image Ia_s that are calculated by the cost synthesizer 330. The disparity value deriver 340 is implemented by the FPGA 31 illustrated in FIG. 9.

The disparity image generator 350 generates a reduced disparity image Ip_s (first disparity image) based on the disparity values Δ derived by the disparity value deriver 340. The reduced disparity image Ip_s is an image obtained by replacing the luminance value of each pixel in the reduced reference image Ia_s with the disparity value Δ corresponding to that pixel. The disparity image generator 350 is implemented by the FPGA 31 illustrated in FIG. 9. In FIG. 12, (a) illustrates an example of the reduced comparison image Ib_s, (b) illustrates an example of the reduced reference image Ia_s, and (c) is a schematic diagram illustrating a conceptual diagram of the reduced disparity image Ip_s generated by the disparity image generator 350.

The disparity image enlarger 360 executes an enlargement process to enlarge the image size of the reduced disparity image Ip_s generated by the disparity image generator 350 to generate a disparity image Ip (second disparity image, enlarged disparity image). Here, an enlargement ratio (second ratio) in the enlargement process by the disparity image enlarger 360 is identical to the inverse of a reduction ratio (first ratio) in the reduction process by the image reducer 310. More specifically, through this process, the disparity image enlarger 360 can generate a disparity image Ip having the same image size as the comparison image Ib and the reference image Ia before reduction by the image reducer 310.

Referring to FIG. 13 and FIG. 14, one example of the enlargement process by the disparity image enlarger 360 is descried. FIG. 13 illustrates a reduced disparity image Ip_s1 as one example of the reduced disparity image Ip_s, and also illustrates a disparity image Ip1 as one example of the disparity image Ip. To make the explanation simpler, four pixels (R1 to R4) located in the upper left corner of the pixels included in the reduced disparity image Ip_s1 illustrated in FIG. 13 are representatively explained. These pixels labeled as R1 to R4 are referential pixels for correcting pixel values for pixels to be added after the enlargement process to find correction pixel values, and are therefore referred to as referential pixels R1 to R4 hereinafter.

Firstly, the disparity image enlarger 360 places additional pixels labeled as C1, C3, and C5 at the bottom side, the right side, and the lower right corner of the referential pixel R1, which is the leftmost and uppermost pixel in the reduced disparity image Ip_s1, as illustrated in FIG. 13. These pixels labeled as C1, C3, and C5 are referred to as correction pixels C1, C3, and C5 because the pixel values of these are calculated and corrected based on the pixel values (disparity values) of the referential pixels in a manner described later. The disparity image enlarger 360 executes similar placement of correction pixels with respect to each of the referential pixels R2 to R4. As a result, a part corresponding to the referential pixels R1 to R4, namely, a two-by-two partial image, illustrated in the reduced disparity image Ip_s1 in FIG. 13 is enlarged into a four-by-four partial image in the disparity image Ip1. More specifically, the reduced disparity image Ip_s1 illustrated in FIG. 13 having an image size of four by four is enlarged into the disparity image Ip1 having a size of eight by eight. Here, as a result of placing correction pixels for all of the referential pixels R1 to R4, a correction pixel C2 is placed as a pixel between the referential pixel R2 and the referential pixel R4, and a correction pixel C4 is placed as a pixel between the referential pixel R3 and the referential pixel R4 in the disparity image Ip1. More specifically, in the disparity image Ip1, correction pixels (first correction pixels) are placed between referential pixels in the row direction and in the column direction, and a correction pixel (second correction pixel) is additionally placed in a space (the position of the correction pixel C5) that is generated between correction pixels placed in the foregoing manner.

Referring next to FIG. 14, one example of a method for calculating the pixel values of the correction pixels C1 to C5.

The disparity image enlarger 360 calculates the pixel value of each of the correction pixels C1 to C4, based on the pixel values of two referential pixels adjacent to that one of the correction pixels C1 to C4 in either of the horizontal and vertical directions. For example, the disparity image enlarger 360 calculates the pixel value of the correction pixel C1, based on the pixel values of the two referential pixels R1 and R3 that are adjacent to the correction pixel C1. The disparity image enlarger 360 calculates the pixel value of the correction pixel C3, based on the pixel values of the two referential pixels R1 and R2 that are adjacent to the correction pixel C3. The same applies to the correction pixels C2 and C4.

Furthermore, the disparity image enlarger 360 calculates the pixel value of the placed correction pixel C5, based on the pixel values of the two correction pixels C1 and C2 adjacent to the correction pixel C5. Although the disparity image enlarger 360 is configured to select the correction pixels C1 and C2 as correction pixels adjacent to the correction pixel C5, the present embodiment is not limited thereto. Alternatively, the disparity image enlarger 360 may be configured to select the correction pixels C3 and C4 and calculate the pixel value of the correction pixel C5, based on the pixel values thereof.

Here, the pixel values of two pixels adjacent to a correction pixel the pixel value of which is to be calculated are denoted as dp1 and dp2, respectively. In order to calculate the specific pixel value of the correction pixel, the disparity image enlarger 360 determines whether Expression (5) below is satisfied (step S81). The symbol "dp_th" in Expression (5) represents a predetermined threshold.

$$|dp1-dp2|>dp\_th \quad (5)$$

The method proceeds to step S82 if Expression (5) is satisfied (step S81: Yes), or proceeds to step S83 if Expression (5) is not satisfied (step S81: No).

In step S82, since the difference between the pixel value dp1 and the pixel value dp2 is larger than the threshold dp_th, the disparity image enlarger 360 calculates the pixel value dp12 of a target correction pixel using the following Equation (6).

$$dp12=\min(dp1,dp2) \quad (6)$$

More specifically, the disparity image enlarger 360 selects, as the pixel value of the target correction pixel, the smaller pixel value of the pixel values dp1 and dp2 of the two pixels adjacent to the target correction pixel. In this manner, an edge portion in the disparity image Ip subjected to the enlargement process can be clearer. Although the method includes setting the pixel value dp12 to the smaller pixel value of the pixel values dp1 and dp2 as indicated by Equation (6), the present embodiment is not limited thereto.

The method may include setting the pixel value dp12 to the larger pixel value of the pixel values dp1 and dp2.

Pixel values for the disparity image Ip are disparity values, and an object is located at a longer distance when this disparity value is smaller. Thus, the pixel value of a correction pixel may be preferably calculated according to Equation (6) in surrounding environments such as, for example, an express highway where more attention should be paid to objects at longer distances than objects at shorter distances. In contrast, the pixel value of a correction pixel may be preferably set to the larger pixel value of the pixel values dp1 and dp2 in surrounding environments such as, for example, an urban street where more attention should be paid to objects at shorter distances than objects at longer distances. Thus, when Expression (5) is satisfied, the method may optionally include switching between the larger pixel value and the smaller pixel value of the pixel values dp1 and dp2 as a value to be set as the pixel value of a target corrected value according to the surrounding environment. Hereinafter, the enlargement process to be performed on a reduced disparity image based on calculation of the pixel value of the correction pixel according to Equation (6) is referred to as a first enlargement process. The enlargement process to be performed on a reduced disparity image with the larger pixel values of the pixel values dp1 and dp2 set as the pixel value of the correction pixel is referred to as a second enlargement process. With respect to objects at short distances, regions corresponding to the objects in the disparity image Ip that are enlarged through the second enlargement process are larger than regions corresponding to the objects in the disparity image Ip that are enlarged through the first enlargement process. In contrast, with respect to objects at long distances, regions corresponding to the objects in the disparity image Ip that are enlarged through the second enlargement process are smaller than regions corresponding to the objects in the disparity image Ip that are enlarged through the first enlargement process. The objects herein refer to objects recognized by the object recognition device 5.

In step S83, since the difference between the pixel value dp1 and the pixel value dp2 is equal to or smaller than the threshold dp_th, the disparity image enlarger 360 calculates the pixel value dp12 correction pixel according to the following Equation (7).

$$dp12=(dp1+dp2)/2 \quad (7)$$

More specifically, the disparity image enlarger 360 sets the average of the pixel values dp1 and dp2 of the two pixels of the target correction pixel as the pixel value of the correction pixel. In this manner, in the disparity image Ip subjected to the enlargement process, the pixel having a pixel value of dp1 and the pixel having a pixel value of dp2 are smoothly connected.

The procedure in FIG. 14 includes, in step S81, switching between calculations of the pixel value (disparity value) of the correction pixel using Equation (6) and using Equation (7) depending on whether Expression (5) is satisfied or not. However, the present embodiment is not limited thereto. For example, the disparity image enlarger 360 may skip the processes in step S81 and S82 and unconditionally calculate the pixel values (disparity values) of correction pixels in the disparity image Ip.

As described above, the disparity image enlarger 360 sets each of the pixels included in the reduced disparity image Ip_s1 as a referential pixel, and places correction pixels around the referential pixel. Thereafter, the disparity image enlarger 360 performs the enlargement process on the reduced disparity image Ip_s1 to generate the disparity image Ip1 by calculating, according to the procedure illustrated in FIG. 14, the pixel values of each of the correction pixels based on the pixel values of two pixels adjacent thereto (each being a referential pixel or a correction pixel) that have already determined pixel values. In the case of a correction pixel (for example, a pixel in the rightmost column in FIG. 13) the pixels adjacent to which do not include two pixels that have already determined pixel values, the same pixel value as the pixel value of one pixel having an already determined pixel value may be set as the pixel value of the correction pixel.

Although FIG. 13 illustrates an example where correction pixels are placed at the bottom side, the right side, and the lower right corner of each referential pixel, the present embodiment is not limited thereto. For example, correction pixels may be placed at the upper side, the left side, and the upper left corner of each referential pixel.

Although FIG. 13 illustrates an example where the image size of the reduced disparity image Ip_s is enlarged twice by placing three correction pixels for one referential pixel, the present embodiment is not limited thereto. Another enlargement ratio may be used in the enlargement. For example, the image size of the reduced disparity image Ip_s may be enlarged by placing eight correction pixels for one referential pixel, so that a part corresponding to the referential pixels R1 to R4 illustrated in the reduced disparity image Ip_s1 in FIG. 13, i.e., a two-by-two partial image, is enlarged into a six-by-six partial image in the disparity image Ip1. In this case, calculations of the pixel values of correction pixels may be set pursuant to the above-described manner. More specifically, in this case, since two pixels (each being a referential pixel or a correction pixel) having already determined pixel values are located at both ends of two correction pixels adjacent to each other, pixel values of two target correction pixels adjacent to each other may be calculated based on such two pixels. In addition, switching between the enlargement ratios (and reduction ratios) according to the need of a user may be optionally enabled, or switching therebetween based on processing loads on the FPGA 31 and the CPU 32 may be included.

The image reducer 310, the cost calculator 320, the cost synthesizer 330, the disparity value deriver 340, the disparity image generator 350, and the disparity image enlarger 360 are implemented by the FPGA 31 and other integrated circuits, that is, by hardware circuits, although the present embodiment is not limited thereto. More specifically, at least one of the image reducer 310, the cost calculator 320, the cost synthesizer 330, the disparity value deriver 340, the disparity image generator 350, and the disparity image enlarger 360 may be implemented by having a computer program in the form of software executed by the CPU 32. Additionally, the block configuration of the object recognition system 1 illustrated in FIG. 10 conceptually represents functions, and the present embodiment is not limited to such a configuration.

Image Processing Operation of Disparity Value Deriving Device

Figure 15:
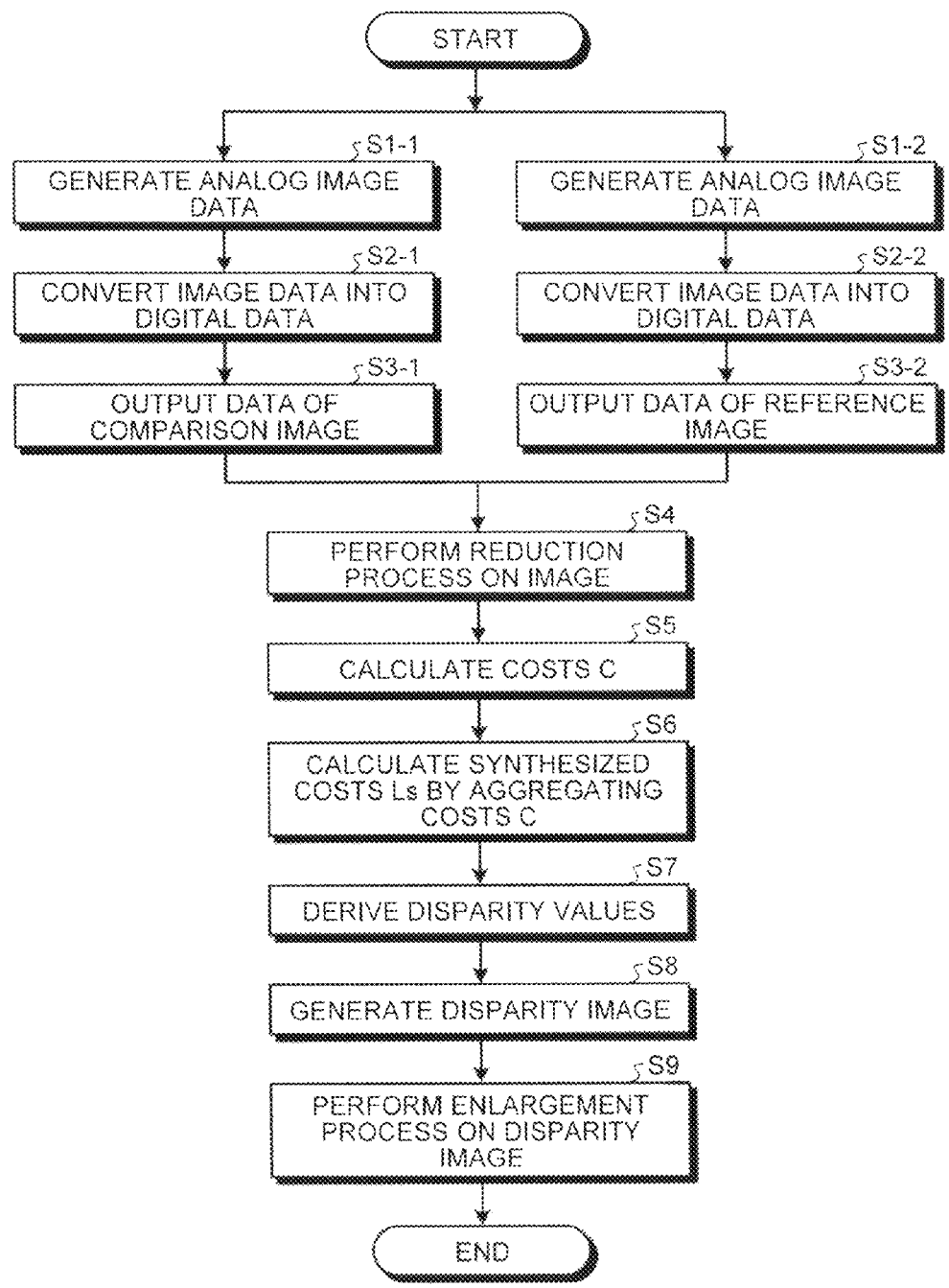
FIG. 15 is a flowchart illustrating an example of operation for a stereo matching process by the disparity value deriving device according to the present embodiment.

FIG. 15 is a flowchart illustrating an example of the operation of a stereo matching process in the disparity value deriving device according to the present embodiment. Referring to FIG. 15, the operational procedure of image processing based on the stereo matching process in the disparity value deriving device 3 according to the present embodiment will be described.

<Step S1-1>

The image acquisition unit 110 of the disparity value deriving device 3 generates an analog image signal by imaging an object ahead with the left camera (imaging device 10b) and obtains a luminance image that is an image based on the image signal. This step results in obtainment of an image to be subjected to later image processing. The procedure then proceeds to step S2-1.

<Step S1-2>

The image acquisition unit 110 of the disparity value deriving device 3 generates an analog image signal by imaging an object ahead with the right camera (imaging device 10a) and obtains a luminance image that is an image based on the image signal. This step provides an image to be subjected to later image processing. The procedure then proceeds to step S2-2.

<Step S2-1>

The filter 210 of the disparity value deriving device 3 removes noise from the analog image signal obtained by imaging with the imaging device 10b and converts the image signal into digital image data. This conversion into digital image data enables image processing by pixel on an image based on the image data. The procedure then proceeds to step S3-1.

<Step S2-2>

The filter 210 of the disparity value deriving device 3 removes noise from the analog image signal obtained by imaging with the imaging device 10a and converts the image signal into digital image data. This conversion into digital image data enables image processing by pixel on an image based on the image data. The procedure then proceeds to step S3-2.

<Step S3-1>

The filter 210 outputs an image based on the digital image data converted at step S2-1 as a comparison image Ib in the stereo matching process. This step provides an image to be compared for finding disparity values in the stereo matching process. The procedure then proceeds to step S4.

<Step S3-2>

The filter 210 outputs an image based on the digital image data obtained by the conversion at step S2-2 as a reference image Ia in the stereo matching process. This step provides an image to be used as a reference for finding disparity values in the stereo matching process. The procedure then proceeds to step S4.

<Step S4>

The image reducer 310 of the disparity value deriving device 3 executes a reduction process for reducing the image sizes of the comparison image Ib and the reference image Ia that have been output from the filter 210. Specifically, the image reducer 310 executes the reduction process on the comparison image Ib to generate the reduced comparison image Ib_s and executes the reduction process on the reference image Ia to generate the reduced reference image Ia_s. This reduction of the comparison image Ib and the reference image Ia enables reduction in calculation amount for calculating the costs C and the synthesized costs Ls in a later stage, thereby enabling reduction in processing load. The procedure then proceeds to step S5.

<Step S5>

The cost calculator 320 of the disparity value deriving device 3 calculates the cost C(p,d) of each candidate pixel q(x+d,y), based on the luminance value of the reference pixel p(x,y) in the reduce reference image Ia_s and the luminance value of each of the candidate pixels q(x+d,y) for the corresponding pixel that are specified by shifting positions by shift amounts d from the pixel corresponding to the position of the reference pixel p(x,y) on the Epipolar line in the reduced comparison image Ib_s based on the reference pixel p(x,y). Thus, the cost calculator 320 calculates the costs C using the reduced comparison image Ib_s and the reduced reference image Ia_s having image sizes reduced, instead of using the comparison image Ib and the reference image Ia before the reduction process by the image reducer 310. In this manner, the processing load for calculating the costs C can be reduced, and the consumption of memory (in the RAM 34 illustrated in FIG. 9) can be reduced. The procedure then proceeds to step S6.

<Step S6>

Using pixels in the neighborhood of the reference pixel p(x,y) in the reduced reference image Ia_s as reference pixels, the cost synthesizer 330 of the disparity value deriving device 3 calculates the synthesized cost Ls(p,d) (a synthesis degree of matching) of the candidate pixel q(x+d,y) by aggregating the costs C of the pixels in the reduced comparison image Ib_s for these reference pixels, with the cost C(p,d) of the candidate pixel q(x+d,y) calculated by the cost calculator 320. Thus, the cost synthesizer 330 calculates the synthesized costs Ls using the costs C calculated by the cost calculator 320 using the reduced comparison image Ib_s and the reduced reference image Ia_s the image sizes of which have been reduced, instead of using not the shift amounts d shifted in units of pixels. More specifically, the cost synthesizer 330 is configured not to calculate the synthesized costs Ls using the costs C calculated using the comparison image Ib and the reference image Ia before the reduction process. In this manner, the processing load for calculating the costs C can be reduced, and the consumption of memory (in the RAM 34 illustrated in FIG. 9) can be reduced. The procedure then proceeds to step S7.

<Step S7>

The disparity value deriver 340 of the disparity value deriving device 3 drives a disparity value Δ by assuming, as the disparity value Δ, the minimum value of the synthesized costs Ls of pixels in the reduced comparison image Ib_s for the reference pixel in the reduced reference image Ia_s that have been calculated by the cost synthesizer 330. The derived disparity value Δ serves as a value indicating the distance of an object portion that corresponds to the reference pixel in the reduced comparison image Ib_s. The procedure then proceeds to step S8.

<Step S8>

The disparity image generator 350 of the disparity value deriving device 3 generates a reduced disparity image Ip_s, based on the disparity values Δ derived by the disparity value deriver 340. The reduced disparity image Ip_s is an image obtained by replacing the luminance value (pixel value) of each pixel in the reduced reference image Ia_s with the disparity value Δ corresponding to that pixel. The image size of the reduced disparity image Ip_s in this stage is the same as the image size of the reduced reference image Ia_s, and has been smaller than the image sizes of the comparison image Ib and the reference image Ia in steps S3-1 and S3-2. The procedure then proceeds to step S9.

<Step S9>

The disparity image enlarger 360 of the disparity value deriving device 3 generates the disparity image Ip (high density disparity image) by executing the above-described enlargement process for enlarging the image size of the reduced disparity image Ip_s generated by the disparity image generator 350. In this step, the enlargement ratio used by the disparity image enlarger 360 for the enlargement process is the inverse of the reduction ratio used by the image reducer 310 for the reduction process. More specifically, the disparity image enlarger 360 can provide the disparity image Ip having the same image size as those of the comparison image Ib and the reference image Ia before the images are reduced by the image reducer 310.

The image data of the disparity image Ip is then output through the I/F 35 illustrated in FIG. 9, and the distance from the imaging devices 10*a*, 10*b* to the object is calculated by the object recognition device 5.

Example of Equipment Control System Mounted on Vehicle FIG. 16 illustrates an example of an equipment control system according to the present embodiment mounted on a vehicle. Referring to FIG. 16, an example of the equipment control system 60 mounted on a vehicle 100 will be described below.

In the configuration illustrated in FIG. 16, the vehicle 100 configured as an automobile includes the equipment control system 60. The equipment control system 60 includes the disparity value deriving device 3 installed in the inside of the vehicle that is a cabin space, a control device 6, a steering wheel 7, and a brake pedal 8.

The disparity value deriving device 3 has an imaging function of imaging the direction in which the vehicle 100 travels, and is installed, for example, in the vicinity of the rear view mirror on the inside of the front window of the vehicle 100. The disparity value deriving device 3 includes a main body 2, and an imaging device 10*a* and an imaging device 10*b* fixed to the main body 2. The imaging devices 10*a*, 10*b* are fixed to the main body 2 such that an object in the direction in which the vehicle 100 travels can be imaged.

The control device 6 is a device connected to the disparity value deriving device 3 in place of the object recognition device 5 in the object recognition system 1 described above and executes a variety of vehicle control with distance information from the disparity value deriving device 3 to the object that is obtained based on image data of the disparity image received from the disparity value deriving device 3. The control device 6 executes, as an example of the vehicle control, steering control of controlling a steering system (control target) including the steering wheel 7 to avoid an obstacle, or brake control of controlling the brake pedal 8 (control target) to decelerate and stop the vehicle 100, based on image data of the disparity image received from the disparity value deriving device 3.

The safety of driving the vehicle 100 can be improved by executing vehicle control such as steering control or brake control as in the equipment control system 60 including the disparity value deriving device 3 and the control device 6.

As described above, the disparity value deriving device 3 captures an image of objects in front of the vehicle 100. However, the present embodiment is not limited thereto. Specifically, the disparity value deriving device 3 may be installed so as to capture an image of objects in the rear or at the side of the vehicle 100. In this case, the disparity value deriving device 3 can detect the position of, for example, a vehicle behind that follows the vehicle 100 or other vehicles running side by side with the vehicle 100. The control device 6 can detect the danger when the vehicle 100 changes lanes or merges into a lane, and execute the above vehicle control. The control device 6 can also execute the above vehicle control when determining that there is a danger of collision while the vehicle 100 is being backed, for example, in a parking space, based on the disparity image of an obstacle behind the vehicle 100 that is detected by the disparity value deriving device 3.

Main Advantageous Effects of Present Embodiment

As described above, in the disparity value deriving device 3 according to the present embodiment, the image reducer 310 generates the reduced comparison image Ib_s and the reduced reference image Ia_s by executing a reduction process for reducing the image sizes of the comparison image Ib and the reference image Ia. Then, the cost calculator 320 and the cost synthesizer 330 calculates the costs C and the synthesized costs Ls using the reduced comparison image Ib_s and the reduced reference image Ia_s. In this manner, as compared with the case of calculating the costs C and the synthesized cost Ls for the comparison image Ib and the reference image Ia before the reduction process, the consumption of memory (the RAM 34) for calculating the costs C and the synthesized cost Ls can be reduced, and the processing load for image processing can be reduced.

Furthermore, in the disparity value deriving device 3 according to the present embodiment, the reduced disparity image Ip_s generated based on the reduced comparison image Ib_s and the reduced reference image Ia_s is generated by the disparity value deriver 340 and the disparity image generator 350. Thereafter, the disparity image enlarger 360 generates a disparity image Ip by executing the above-described enlargement process on the image size of the reduced disparity image Ip_s by an enlargement ratio that is the inverse of the reduction ratio used by the image reducer 310 for the reduction process. In this manner, a highly precise disparity image can be provided as compared to the case of executing a reduction process based on a known algorithm to generate a reduced disparity image and executing an enlargement process based on a known algorithm. Although the disparity image enlarger 360 is configured to execute the enlargement process on the image size of the reduced disparity image Ip_s by an enlargement ratio that is the inverse of the reduction process used by the image reducer 310 for reduction process, the present embodiment is not limited thereto. More specifically, the disparity image enlarger 360 is not necessarily required to execute the enlargement process by an enlargement ratio that is the inverse of the reduction process used by the image reducer 310 for reduction process, and may be configure to execute the enlargement process at least so as to generate a disparity image having a size suitable for the user's needs.

The cost C for measuring the degree of matching is configured as an evaluation value representing dissimilarity in the above-described embodiment, but may be configured as an evaluation value representing similarity. In this case, the shift amount d corresponding to the largest synthesized cost Ls is the disparity value Δ.

Although the above-described embodiment has been explained by citing the matching in units of pixels to make the explanation simpler, the present embodiment is not limited thereto. The matching may be performed in units of predetermined regions, each of which consists of a plurality of pixels. In this case, a predetermined region that includes a reference pixel is referred to as a reference region, another predetermined region that includes a corresponding pixel is referred to as a corresponding region, and a candidate pixel for the corresponding pixel is referred to as a candidate region. Furthermore, a case where this reference region includes only a reference pixel, a case where the corresponding region includes only a corresponding pixel, and a case where the candidate region includes only a candidate pixel are also applicable.

Although the above-described effects of the above-described embodiment more preferably work out when a method of deriving the disparity value Δ from the synthesized costs Ls, the present embodiment is not limited thereto. A method of deriving the disparity value Δ directly from the costs C may be employed.

The present embodiment can be interpreted as follows. Specifically, a disparity value deriving device according to the present embodiment is configured to derive a disparity value Δ indicating disparity for an object, based on a reference image Ia obtained by an imaging device 10a for imaging the object, and a comparison image Ib obtained by an imaging device 10b for imaging the object, the imaging device 10b being located at a different position from the imaging device 10a. The disparity value deriving device includes: an image reducer 310 to generate a reduced reference image Ia_s and a reduced comparison image Ib_s by reducing the reference image Ia and the comparison image Ib, respectively, by a reduction ratio; a cost calculator 320 to calculate costs C of a plurality of regions in a predetermined range in the reduced comparison image Ib_s in connection with a reference pixel p in the reduced reference image Ia_s, the predetermined range including a corresponding pixel that corresponds to the reference pixel p; a cost synthesizer 330 to obtain a synthesized cost Ls for each of the regions by aggregating the costs C in the reduced comparison image Ib_s for reference pixels located in the neighborhood of the reference pixel p, with the cost C of the region; a disparity value deriver 340 (a deriving unit) to derive a disparity value Δ between the reference pixel p and a corresponding region, based on the synthesized costs Ls; a disparity image generator 350 to generate the reduced disparity image Ip_s based on disparity values Δ derived by the disparity value deriver 340; and a disparity image enlarger 360 (an enlarging unit) to enlarge the reduced disparity image Ip_s by an enlargement ratio to generate the disparity image Ip, by placing at least one correction pixel (one of the correction pixels C1 to C4 illustrated in FIG. 13) between referential pixels (the referential pixels R1 to R4 illustrated in FIG. 13) that are consecutive in each of the column and row directions, and then placing another correction pixel (the correction pixel C5 illustrated in FIG. 13) in a space generated between consecutive ones of the foregoing correction pixels, the referential pixels being pixels included in the reduced disparity image Ip_s.

In the disparity value deriving device according to the present embodiment, in the disparity image Ip, the disparity image enlarger 360 obtains a pixel value of the correction pixel placed between the consecutive referential pixels based on pixel values of these referential pixels, and obtains a pixel value of the correction pixel placed between the consecutive correction pixels that have already-determined pixel values, based on pixel values of these correction pixels having already-determined pixel values.

In the disparity value deriving device according to the present embodiment, the cost calculator 320 calculates the cost C of each of a plurality of candidate regions based on a luminance value of the reference pixel p and luminance values of the candidate regions, the candidate regions being specified by shifting positions by shift amounts d in a predetermined range from a pixel corresponding to the position of the reference pixel p in the reduced comparison image Ib_s and being set as candidates for the corresponding region. The disparity value deriver 340 then derives the disparity value Δ based on the shift amount d that corresponds to the minimum value of the synthesized costs Ls of the respective candidate regions in the reduced comparison image Ib_s, and the disparity image generator 350 then generates the reduced disparity image Ip_s by replacing luminance values of the reduced reference image Ia_s with the disparity values Δ derived by the disparity value deriver 340.

In the disparity value deriving device according to the present embodiment, in the disparity image Ip, the disparity image enlarger 360 obtains a pixel value of the correction pixel placed between the consecutive referential pixels, based on a difference between pixel values of these referential pixels, and obtains a pixel value of the correction pixel placed between the consecutive correction pixels that have already-determined pixel values in the disparity image Ip, based on a difference between pixel values of these correction pixels having already-determined pixel values.

In the disparity value deriving device according to the present embodiment, when the corresponding difference between the pixel values is larger than a predetermined threshold, the disparity image enlarger 360 sets either the larger value or the smaller value of these two pixel values as each of the pixel values of the correction pixels in the disparity image Ip, and, when the corresponding difference between the pixel values is smaller than the predetermined threshold, the disparity image enlarger 360 sets the average of these two pixel values as each of the pixel values thereof.

In the disparity value deriving device according to the present embodiment, when the corresponding difference between the pixel values is larger than a predetermined threshold, the disparity image enlarger 360 is enabled to switch between the two pixel values as each of the pixel values of the correction pixels.

In the disparity value deriving device according to the present embodiment, the enlargement ratio is an inverse of the reduction ratio.

In the disparity value deriving device according to the present embodiment, the enlargement ratio and the reduction ratio are changeable to any desirable ratios.

Another disparity value deriving device according to the present embodiment is configured to derive a disparity value Δ indicating disparity for an object, based on a reference image Ia obtained by an imaging device 10a for imaging the object and a comparison image Ib obtained by an imaging device 10b for imaging the object, the imaging device 10b being located at a different position from the imaging device 10a. The disparity value deriving device includes: an image reducer 310 to generate a reduced reference image Ia_s and a reduced comparison image Ib_s by reducing the reference image Ia and the comparison image Ib, respectively, by a reduction ratio; a cost calculator 320 to calculate costs C of a plurality of regions in a predetermined range in the reduced comparison image Ib_s in connection with a reference pixel p in the reduced reference image Ia_s, the predetermined range including a corresponding pixel that corresponds to the reference pixel p; a disparity value deriver 340 (a deriving unit) to derive a disparity value Δ between the reference pixel p and the corresponding pixel based on the costs C; a disparity image generator 350 to generate the reduced disparity image Ip_s based on disparity values Δ derived by the disparity value deriver 340; a disparity image enlarger 360 (an enlarging unit) to enlarge the reduced disparity image Ip_s by an enlargement ratio to generate the disparity image Ip, by placing at least one correction pixel (one of the correction pixels C1 to C4 illustrated in FIG. 13) between referential pixels (the referential pixels R1 to R4 illustrated in FIG. 13) that are consecutive in each of the column and row directions, and then placing another correction pixel (the correction pixel C5 illustrated in FIG. 13) in a space generated between consecutive ones of the foregoing correction pixels, the referential pixels being pixels included in the reduced disparity image Ip_s.

An equipment control system according to the present embodiment includes: any one of the above disparity value deriving devices; and a control device 6 to control a control target according to information on a distance from the disparity value deriving device and the object, the information having been obtained from the disparity value Δ derived by the disparity value deriving device.

A movable apparatus according to the present embodiment includes the above equipment control system.

A robot according to the present embodiment includes the above equipment control system.

A disparity value deriving method according to the present embodiment is provided for deriving a disparity value Δ indicating disparity for an object, based on a reference image Ia obtained by an imaging device 10a for imaging the object, and a comparison image Ib obtained by an imaging device 10b for imaging the object, the imaging device 10b being located at a different location from the imaging device 10a. The disparity value deriving method includes: reducing the reference image Ia and the comparison image Ib by a reduction ratio to generate a reduced reference image Ia_s and a reduced comparison image Ib_s, respectively; calculating costs C of a plurality of regions in a predetermined range in the reduced comparison image Ib_s in connection with a reference pixel p in the reduced reference image Ia_s, the predetermined range including a corresponding pixel that corresponds to the reference pixel p; obtaining a synthesized cost Ls of each of the regions by aggregating the costs C in the reduced comparison image Ib_s for reference pixels in the neighborhood of the reference pixel p, with the cost C of the region; deriving a disparity value Δ between the reference pixel p and a corresponding region, based on the synthesized costs Ls; generating the reduced disparity image Ip_s based on disparity values Δ derived by the disparity value deriver 340; and enlarging the reduced disparity image Ip_s by an enlargement ratio to generate the disparity image Ip, by placing at least one correction pixel (one of the correction pixels C1 to C4 illustrated in FIG. 13) between referential pixels (the referential pixels R1 to R4 illustrated in FIG. 13) that are consecutive in each of the column and row directions, and then placing another correction pixel (the correction pixel C5 illustrated in FIG. 13) in a space generated between consecutive ones of the foregoing correction pixels, the referential pixels being pixels included in the reduced disparity image Ip_s.

A computer program according to the present embodiment is provided for deriving a disparity value Δ indicating disparity for an object, based on a reference image Ia obtained by an imaging device 10a for imaging the object, and a comparison image Ib obtained by an imaging device 10b for imaging the object, the imaging device 10b being located at a different position from the imaging device 10a. The computer program causes a computer to implement: an image reducer 310 to generate a reduced reference image Ia_s and a reduced comparison image Ib_s by reducing the reference image Ia and the comparison image Ib, respectively, by a reduction ratio; a cost calculator 320 to calculate costs C of a plurality of regions in a predetermined range in the reduced comparison image Ib_s in connection with a reference pixel p in the reduced reference image Ia_s, the predetermined range including a corresponding pixel that corresponds to the reference pixel p; a cost synthesizer 330 to obtain a synthesized cost Ls for each of the regions by aggregating the costs C in the reduced comparison image Ib_s for reference pixels located in the neighborhood of the reference pixel p, with the cost C of the region; a disparity value deriver 340 (a deriving unit) to derive a disparity value Δ between the reference pixel p and a corresponding region based on the synthesized costs Ls; a disparity image generator 350 to generate the reduced disparity image Ip_s, based on disparity values Δ derived by the disparity value deriver 340; and a disparity image enlarger 360 (an enlarging unit) to enlarge the reduced disparity image Ip_s by an enlargement ratio to generate the disparity image Ip, by placing at least one correction pixel (one of the correction pixels C1 to C4 illustrated in FIG. 13) between referential pixels (the referential pixels R1 to R4 illustrated in FIG. 13) that are consecutive in each of the column and row directions, and then placing another correction pixel (the correction pixel C5 illustrated in FIG. 13) in a space generated between consecutive ones of the foregoing correction pixels, the referential pixels being pixels included in the reduced disparity image Ip_s.

Another disparity value deriving device according to the present embodiment is configured to derive a disparity value $\Delta$ indicating disparity for an object, based on a reference image Ia obtained by imaging the object from a position at which an imaging device 10a is installed, and a comparison image Ib obtained by imaging the object from a position at which an imaging device 10b is installed, and output the disparity value $\Delta$ to an object recognition device 5 configured to recognize an object in the reference image Ia. The position at which the imaging device 10b is installed is different from the position at which the imaging device 10a is installed. The disparity value deriving device includes: a disparity image generator 350 to generate a reduced disparity image Ip_s having a smaller size than the reference image Ia and the comparison image Ib, based on the reference image Ia and the comparison image Ib and based on the disparity value $\Delta$; and a disparity image enlarger 360 (an enlarging unit) generates an enlarged disparity image (disparity image Ip) by enlarging the reduced disparity image Ip_s through at least one of a first enlargement process and a second enlargement process. The first enlargement process and the second enlargement process are such that: with regard to an object near the positions at which the imaging devices 10a, 10b are installed, a region corresponding to the object as recognized by the object recognition device 5 in the enlarged disparity image output through the second enlargement process is larger than a region corresponding to the object as recognized by the object recognition device 5 in the enlarged disparity image output through the first enlargement process; and, with regard to an object far from the positions at which the imaging devices 10a, 10b are installed, a region corresponding to the object as recognized by the object recognition device 5 in the enlarged disparity image output through the second enlargement process is smaller than a region corresponding to the object as recognized by the object recognition device 5 in the enlarged disparity image output through the first enlargement process.

According to the embodiments described above, it is possible to reduce the memory consumption and reduce the image processing load.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disparity value deriving device for deriving a disparity value representing disparity for an object from a first reference image obtained by a first imaging unit for imaging the object and a first comparison image obtained by a second imaging unit for imaging the object, the second imaging unit being located at a different position from the first imaging unit, the disparity value deriving device comprising:
a reducer configured to generate a second reference image and a second comparison image by reducing the first reference image and the first comparison image, respectively, by a first ratio;
a calculator configured to calculate degrees of matching of a plurality of regions in a predetermined range in the second comparison image with a first reference region in the second reference image, the predetermined range including a corresponding region that corresponds to the first reference region;
a synthesizer configured to obtain a synthesis degree of matching for each of the regions by aggregating the degrees of matching in the second comparison image for a second reference region located in neighborhood of the first reference region, with the degree of matching of the regions;
a deriving unit configured to derive the disparity value between the first reference region and the corresponding region, based on the synthesis degrees of matching;
a generator configured to generate a first disparity image based on disparity values derived by the deriving unit; and
an enlarging unit configured to enlarge the first disparity image by a second ratio to generate a second disparity image, by placing at least one first correction pixel between referential pixels that are consecutive in column and row directions and by placing a second correction pixel in a space generated between consecutive ones of the first correction pixels, the referential pixels being pixels included in the first disparity image.

2. The disparity value deriving device according to claim 1, wherein, in the second disparity image, the enlarging unit obtains a pixel value of the first correction pixel placed between the consecutive referential pixels, based on pixel values of the referential pixels, and obtains a pixel value of the second correction pixel placed between the consecutive first correction pixels that have already-determined pixel values, based on the pixel values of the first correction pixels.

3. The disparity value deriving device according to claim 1, wherein
the calculator calculates the degree of matching of each of a plurality of candidate regions based on a luminance value of the first reference region and luminance values of the candidate regions, the candidate regions being specified by shifting positions by a shift amount in the predetermined range from a region corresponding to the position of the first reference region in the second comparison image and being set as candidates for the corresponding region,
the deriving unit derives the disparity value based on the shift amount that corresponds to an extreme of the degrees of matching of the respective candidate regions in the second comparison image, and
the generator generates the first disparity image by replacing luminance values of the second reference image with the disparity values derived by the deriving unit.

4. The disparity value deriving device according to claim 1, wherein, in the second disparity image, the enlarging unit obtains a pixel value of the first correction pixel placed between the consecutive referential pixels, based on a difference between pixel values of the referential pixels, and obtains a pixel value of the second correction pixel placed between the consecutive first correction pixels that have already-determined pixel values, based on a difference between pixel values of the first correction pixels.

5. The disparity value deriving device according to claim 4, wherein, when the corresponding difference between the pixel values is larger than a predetermined threshold, the enlarging unit sets either the larger value or the smaller value of these two pixel values as each of the pixel values of the first correction pixel and the second correction pixel in the second disparity image, and, when the corresponding difference between the pixel values is smaller than the predetermined threshold, the enlarging unit sets an average of these two pixel values as each of the pixel values of the first correction pixel and the second correction pixel.

6. The disparity value deriving device according to claim 5, wherein, when the corresponding difference between the pixel values is larger than the predetermined threshold, the enlarging unit is enabled to switch between these two pixel values as each of the pixel values of the first correction pixel and the second correction pixel.

7. The disparity value deriving device according to claim 1, wherein the second ratio is an inverse of the first ratio.

8. The disparity value deriving device according to claim 1, wherein the first ratio and the second ratio are changeable to any desirable ratios.

9. An equipment control system comprising:
   the disparity value deriving device according to claim 1; and
   a control device configured to control a control target according to information on a distance from the disparity value deriving device and the object, the information having been obtained from the disparity value derived by the disparity value deriving device.

10. A movable apparatus comprising the equipment control system according to claim 9.

11. A robot comprising the equipment control system according to claim 9.

12. A disparity value deriving method for deriving a disparity value representing disparity for an object from a first reference image obtained by a first imaging unit for imaging the object and a first comparison image obtained by a second imaging unit for imaging the object, the second imaging unit being located at a different position from the first imaging unit, the disparity value deriving device comprising:
   generating a second reference image and a second comparison image by reducing the first reference image and the first comparison image, respectively, by a first ratio;
   calculating degrees of matching of a plurality of regions in a predetermined range in the second comparison image with a first reference region in the second reference image, the predetermined range including a corresponding region that corresponds to the first reference region;
   obtaining a synthesis degree of matching for each of the regions by aggregating the degrees of matching in the second comparison image for a second reference region located in neighborhood of the first reference region, with the degree of matching of the regions;
   deriving the disparity value between the first reference region and the corresponding region, based on the synthesis degrees of matching;
   generating a first disparity image based on disparity values derived by the deriving unit; and
   enlarging the first disparity image by a second ratio to generate a second disparity image, by placing at least one first correction pixel between referential pixels that are consecutive in column and row directions and by placing a second correction pixel in a space generated between consecutive ones of the first correction pixels, the referential pixels being pixels included in the first disparity image.

* * * * *